US007123289B2

(12) United States Patent
Tsuji

(10) Patent No.: US 7,123,289 B2
(45) Date of Patent: Oct. 17, 2006

(54) IMAGE READING APPARATUS AND METHOD

(75) Inventor: Junichi Tsuji, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 651 days.

(21) Appl. No.: 10/401,559

(22) Filed: Mar. 31, 2003

(65) Prior Publication Data

US 2003/0202094 A1 Oct. 30, 2003

(30) Foreign Application Priority Data

Mar. 29, 2002 (JP) ............................. 2002-097637

(51) Int. Cl.
*H04N 7/18* (2006.01)
(52) U.S. Cl. ........................................... 348/96; 348/97
(58) Field of Classification Search ........... 348/80–120
See application file for complete search history.

(56) References Cited

U.S. PATENT DOCUMENTS 5,337,164 A * 8/1994 Yabe et al. .................. 358/487
5,541,644 A * 7/1996 Nanba .......................... 348/96
6,266,127 B1* 7/2001 Iida .............................. 355/38
6,658,163 B1* 12/2003 Takaoka ...................... 382/254

FOREIGN PATENT DOCUMENTS

| DE | 199 30 164 A1 | 1/2000 |
| EP | 0 516 055 A2 | 12/1992 |
| JP | 5-142661 | 6/1993 |
| JP | 2000-284377 | 10/2000 |

\* cited by examiner

*Primary Examiner*—Andy Rao
(74) *Attorney, Agent, or Firm*—Sughrue Mion, PLLC

(57) ABSTRACT

An image reading apparatus in which, in a case in which one of a recorded position of a leading image frame of a film or recorded positions of images successive from the leading image frame of the film, among a plurality of image frames recorded on the film, cannot be specified, the film is conveyed to detect images until the image frame whose recorded position can be specified is arrived, the recorded position of the image frame whose recorded position cannot be specified, is specified on the basis of a recorded position of the image frame whose recorded position can be specified, and the film is conveyed in a predetermined direction such that the leading image frame is positioned at an optical axis of an image reading section, and image reading is carried out from the leading image frame, is provided.

21 Claims, 12 Drawing Sheets

IMAGE READING APPARATUS AND METHOD

BACKGROUND OF THE INVENTION

1. Field of the Invention

The present invention relates to an image reading apparatus and method, and in particular, to an image reading apparatus and method which read a plurality of images recorded on a film.

2. Description of the Related Art

In image reading of a 135 size photographic film, in a case in which, even though an image frame which is supposed to be a leading frame is conveyed to a reading position, frame positions of subsequent frames are not defined, conveyance of the photographic film is stopped and an operator sets a leading frame position at the reading position manually.

Regarding technique relating to such positioning of an image frame, there is a technique in which positioning of a failure image frame, whose frame edge cannot be detected due to transmission density distribution being abnormal, is carried out by feeding a film with a determined amount. In this technique, a film conveying amount for the determined-amount-feeding is set on the basis of trends which are unique to the film being processed. To be more concretely, a trend of a size of the image frames which are photographed by a camera photographing images on the film is grasped by obtaining an average of image frame lengths (dimensions in a film conveying direction) $L_{1n}$ of all normal image frames, which are located in frontal position on the film with respect to the failure image frame which is to be positioned, is obtained. Further, a trend of a feeding pitch of the image frames of the camera is grasped by obtaining an average of dimensions $L_{2n}$ between the normal image frames. Thus, the film conveying amount for the determined-amount-feeding is set on the basis of the trends (sum of the average of $L_{1n}$ and the average of $L_{2n}$). Therefore, in this technique, the positioning of the failure image frame can be positioned correctly compared to a case in which the film conveying amount is set to a predetermined amount based on the specification.

(refer to FIGS. 12 and 18 of Japanese Patent Application Laid-Open (JP-A) No. 5-142661)

However, in this prior technique, the above mentioned trends which are unique to the film cannot be grasped in a case in which the failure image frame is a leading image frame (a first image frame) of the film. Accordingly, in this case, the film is conveyed by a predetermined reference amount. Namely, it is necessary that an operator sets the leading image frame to the proper reading position manually after the film is conveyed by the predetermined reference amount.

Further, there is another technique in which, in a state in which at least one of an edge of an image frame at an upstream side in a conveying direction and an edge of the image frame at a downstream side in the conveying direction cannot be detected, a central position of this image frame is set on the basis of a central position of an image frame located at the downstream side, which has been already set, or on the basis of positions of a downstream side edge or an upstream side edge of an image located at the downstream side, which have been already set.

(refer to FIGS. 10 and 13 of Japanese Patent Application Laid-Open (JP-A) No. 2000-284377)

Further, in this prior reference, it is mentioned that, in a case in which an edge of a leading image frame is not clear, because positions of other image frames have not defined yet, it may be possible that a position of the leading image frame may be determined on the basis of a subsequent image frame whose edge is supposed to be detected by an optical sensor.

However, regarding positioning of the leading image frame whose edge cannot be detected at the reading position, even though the leading image frame may be defined, a concrete process or the like after the leading image frame is defined is not at all written in the Japanese Patent Application Laid-Open (JP-A) No. 2000-284377. Further, in a case of image reading of a film in which many image frames are subsequent from the leading image frame, whose frame edges cannot be detected and whose reading positions cannot be specified, further improvements must be needed.

SUMMARY OF THE INVENTION

With taking the above mentioned facts into consideration, it is an object of the present invention to provide an image reading apparatus and method in which an image reading of a film is improved in a case in which a reading position of a leading image frame or reading positions of a plurality of image frames successive from the leading image frame cannot be defined.

An image reading apparatus of a first aspect of the present invention comprises a moving section which moves the plurality of images to an image reading position respectively by conveying the film, an image detecting section which detects the plurality of images respectively while the film is conveyed, a control section which specifies a recorded position of the image on the basis of the detection result by the image detecting section, and controls the moving section such that the image whose recorded position is specified is positioned at the image reading position, wherein, in a case in which one of a recorded position of a leading image of the film or recorded positions of images successive from the leading image (including the leading image) of the film, among the plurality of images, cannot be specified, the control section further controls of that the recorded position of the image whose recorded position cannot be specified, is specified on the basis of a recorded position of the image whose recorded position can be specified; and the moving section conveys the film in a predetermined direction such that the leading image is positioned at the image reading position.

An image reading apparatus of a second aspect of the present invention comprises a moving section which moves the plurality of images to an image reading position respectively by conveying the film, an image detecting section which detects the plurality of images respectively while the film is conveyed, a control section which specifies a recorded position of the image on the basis of the detection result by the image detecting section, and controls the moving section such that the image whose recorded position is specified is positioned at the image reading position, in a case in which one of a recorded position of a leading image of the film or recorded positions of images successive from the leading image of the film, among the plurality of images, cannot be specified, the control section further controls of that the recorded position of the image whose recorded position cannot be specified, is specified on the basis of a recorded position of the image whose recorded position can be specified, reading of images, including the image whose recorded position can be specified, subsequent to the image whose recorded position can be specified is carried out successively, and the moving section conveys the film in a predetermined direction such that the leading image is positioned at the image reading position after reading of a last image of the film is carried out.

An image reading apparatus of a third aspect of the present invention comprises a moving section which moves the plurality of images to an image reading position respectively by conveying the film, an image detecting section which detects the plurality of images respectively while the film is conveyed, a control section which specifies a recorded position of the image on the basis of the detection result by the image detecting section, and controls the moving section such that the image whose recorded position is specified is positioned at the image reading position, wherein, in a case in which recorded positions of the all plurality of images cannot be specified (none of the plurality of images can be specified), but the image detecting section can detect the images, recorded positions of a predetermined number of images successive from a leading image of the film cannot be specified, but the image detecting section can detect the images, or recorded positions of images cannot be specified during the film is conveyed for a predetermined distance, but the image detecting section can detect the images, the control section further controls the moving section such that an image detected first among the images which can be detected is positioned at the image reading position.

An image reading apparatus of fourth, fifth and sixth aspects according to the first, second and third aspects of the present invention further comprises a mode setting section which can set a stop mode in which conveyance of the film by the moving section is made to stop in a case in which recorded positions of a predetermined number of images successive from the leading image of the film cannot be specified, or recorded positions of images cannot be specified during the film is conveyed in a predetermined distance.

An image reading apparatus of seventh, eighth and ninth aspects according to the first, second and third aspects of the present invention further comprises a mode setting section which can set a conveyance mode in which a conveying direction of the film conveyed by the moving section is limited to one direction in accordance with a type of the film.

An image reading method, of a tenth aspect of the present invention, of an image reading apparatus comprising a moving section which moves a plurality of images to an image reading position respectively by conveying a film, an image detecting section which detects the plurality of images respectively while the film is conveyed, and a control section which specifies a recorded position of the image on the basis of the detection result by the image detecting section, and controls the moving section such that the image whose recorded position is specified is positioned at the image reading position, the method comprising the steps of, in a case in which one of a recorded position of a leading image of the film or recorded positions of images successive from the leading image of the film, among the plurality of images, cannot be specified, specifying the recorded position of the image whose recorded position cannot be specified on the basis of a recorded position of the image whose recorded position can be specified, and conveying the film in a predetermined direction such that the leading image is positioned at the image reading position.

An image reading method, of an eleventh aspect of the present invention, of an image reading apparatus comprising a moving section which moves a plurality of images to an image reading position respectively by conveying a film, an image detecting section which detects the plurality of images respectively while the film is conveyed, and a control section which specifies a recorded position of the image on the basis of the detection result by the image detecting section, and controls the moving section such that the image whose recorded position is specified is positioned at the image reading position, the method comprising the steps of, in a case in which one of a recorded position of a leading image of the film or recorded positions of images successive from the leading image of the film, among the plurality of images, cannot be specified, specifying the recorded position of the image whose recorded position cannot be specified on the basis of a recorded position of the image whose recorded position can be specified, reading of images, including the image whose recorded position can be specified, subsequent to the image whose recorded position can be specified successively, and conveying the film in a predetermined direction such that the leading image is positioned at the image reading position after reading of a last image of the film is carried out.

An image reading method, of a twelfth aspect of the present invention, of an image reading apparatus comprising a moving section which moves a plurality of images to an image reading position respectively by conveying a film, an image detecting section which detects the plurality of images respectively while the film is conveyed, and a control section which specifies a recorded position of the image on the basis of the detection result by the image detecting section, and controls the moving section such that the image whose recorded position is specified is positioned at the image reading position, wherein, in a case in which recorded positions of the all plurality of images cannot be specified (none of the plurality of images can be specified), but the image detecting section can detect the images, recorded positions of a predetermined number of images successive from a leading image of the film cannot be specified, but the image detecting section can detect the images, or recorded positions of images cannot be specified during the film is conveyed for a predetermined distance, but the image detecting section can detect the images, the method comprising the step of positioning an image detected first among the images which can be detected at the image reading position.

In an image reading apparatus of a thirteenth aspect according to the first aspect of the present invention, in a case in which the image whose recorded position can be specified is detected after the leading image of the film arrives at the image reading position, the leading image is positioned at the image reading position by the film being conveyed in the reverse direction.

In an image reading method of a fourteenth aspect according to the tenth aspect of the present invention, in a case in which the image whose recorded position can be specified is detected after the leading image of the film arrives at the image reading position, the leading image is positioned at the image reading position by the film being conveyed in the reverse direction.

In an image reading apparatus of a fifteenth aspect according to the first aspect of the present invention, in a case in which the image whose recorded position can be specified is detected before the leading image of the film arrives at the image reading position, the leading image is positioned at the image reading position without the film being conveyed in the reverse direction.

In an image reading method of a sixteenth aspect according to the tenth aspect of the present invention, in a case in which the image whose recorded position can be specified is detected before the leading image of the film arrives at the image reading position, the leading image is positioned at the image reading position without the film being conveyed in the reverse direction.

In an image reading apparatus of a seventeenth and eighteenth aspects according to the first and second aspects of the present invention, the film is conveyed to detect images until the image whose recorded position can be specified is detected.

In an image reading method of a nineteenth and twentieth aspects according to the tenth and eleventh aspects of the present invention, the film is conveyed to detect images until the image whose recorded position can be specified is detected.

In the first aspect of the present invention, the image detecting section detects the plurality of images recorded on the film respectively while the film is conveyed by the moving section. The control section specifies the recorded position of the detected image on the basis of the detection result by the image detecting section, and controls the moving section such that the image whose recorded position is specified is positioned at the image reading position. Further, in the case in which one of the recorded position of the leading image of the film or the recorded positions of images successive from the leading image of the film, among the plurality of images recorded on the film, cannot be specified, the control section controls of that the film is conveyed to detect images until the image whose recorded position can be specified is arrived at the image detecting section, the recorded position of the image whose recorded position cannot be specified, is specified on the basis of the recorded position of the image whose recorded position can be specified, and the moving section conveys the film in the predetermined direction such that the leading image is positioned at the image reading position. Then, reading of the images is carried out from the leading image in a sequential order.

Because the leading image of the film or the images successive from the leading image of the film are automatically made to position at the image reading position, which was difficult in the conventional art, an operator does not need to carry out an annoyance operation in which an image is positioned at the image reading position manually in a case in which the leading image cannot be specified, which was carried out in the conventional art. Accordingly, burden of the operator is reduced, and efficiency of the image reading processing can be improved.

In the second aspect of the present invention, in the case in which one of the recorded position of the leading image of the film or the recorded positions of images successive from the leading image of the film, among the plurality of images recorded on the film, cannot be specified, the control section controls of that the film is conveyed to detect images until the image whose recorded position can be specified is arrived at the image detecting section, the recorded position of the image whose recorded position cannot be specified, is specified on the basis of the recorded position of the image whose recorded position can be specified. Then, reading of images including the image whose recorded position can be specified and subsequent to the image whose recorded position can be specified are carried out successively, and the moving section conveys the film in the predetermined direction such that the leading image is positioned at the image reading position after reading of the last image of the film is carried out. Thus, it is possible that the leading image of the film or the images successive from the leading image of the film are confirmed before the image reading, and reading position of the image are corrected if necessary.

Also, it is possible that the leading image of the film or the images successive from the leading image of the film are confirmed before the image reading, then decided that reading of the images is not carried out if necessary. Namely, options of the image reading processing can increase.

In the third aspect of the present invention, in the case in which one of that recorded positions of the all plurality of images cannot be specified, and the image detecting section can detect the images, recorded positions of the predetermined number of images successive from the leading image of the film cannot be specified, and the image detecting section can detect the images, or recorded positions of images cannot be specified during the film is conveyed in the predetermined distance, and the image detecting section can detect the images, the image detected first among the images which can be detected is positioned at the image reading position. As the result, because the image detected first among the images which can be detected is positioned at the image reading position automatically, an operator does not need to find the image (need not to position the image at the image reading position) while the operator confirms a monitored image of a read region displayed at a displaying section such as a display. Accordingly, burden of the operator is reduced, and efficiency of the image reading processing can be improved.

In the fourth, fifth and sixth aspects of the present invention according to the first, second and the third aspects, respectively, when the mode setting section sets the stop mode, conveyance of the film by the moving section is made to stop in the case in which recorded positions of the predetermined number of images successive from the leading image of the film cannot be specified, or recorded positions of images cannot be specified during the film is conveyed in the predetermined distance. Accordingly, in a case in which a position of an image cannot be specified if the last image of the film is not arrived at the image detecting section, the operator can carry out positioning manually after the conveyance of the film by the moving section is made to stop, therefore, a time required for image reading can be reduced.

In the seventh, eighth and ninth aspects of the present invention according to the first, second and the third aspects, respectively, by setting the conveyance mode in which the conveying direction of the film conveyed by the moving section is limited to one direction, for a 135 size reversal film, which is easily scratched (damaged) when it is conveyed in an opposite direction, it can be prevented that the film is damaged by being added thereto scratches or the like.

In the tenth aspect of the invention, the image reading method is characterized by that, in a case in which one of the recorded position of the leading image of the film or recorded positions of images successive from the leading image of the film, among the plurality of images recorded on the film, cannot be specified, the film is conveyed to detect images until the image whose recorded position can be specified is arrived at the image detecting section, the recorded position of the image whose recorded position cannot be specified, is specified on the basis of a recorded position of the image whose recorded position can be specified, and the moving section conveys the film in a predetermined direction such that the leading image is positioned at the image reading position. Accordingly, efficiency of the image reading processing can be improved.

In the eleventh aspect of the invention, the image reading method is characterized by that, in the case in which one of the recorded position of the leading image of the film or the recorded positions of images successive from the leading image of the film, among the plurality of images recorded on the film, cannot be specified, the film is conveyed to detect images until the image whose recorded position can be specified is arrived at the image detecting section, the recorded position of the image whose recorded position cannot be specified, is specified on the basis of the recorded position of the image whose recorded position can be specified, reading of images, including the image whose recorded position can be specified, subsequent to the image whose recorded position can be specified are carried out successively, and the moving section conveys the film in the predetermined direction such that the leading image is positioned at the image reading position after reading of the last image of the film is carried out. Accordingly, options of the image reading processing can increase.

In the twelfth aspect of the invention, the image reading method is characterized by that, in the case in which one of that, recorded positions of the all plurality of images cannot be specified, and the image detecting section can detect the images, recorded positions of the predetermined number of images successive from the leading image of the film cannot be specified, and the image detecting section can detect the images, or recorded positions of images cannot be specified during the film is conveyed in the predetermined distance, and the image detecting section can detect the images, the image detected first among the images which can be detected is positioned at the image reading position. Accordingly, efficiency of the image reading processing can be improved.

DESCRIPTION OF THE PREFERRED EMBODIMENTS

Embodiments of the present invention will be described in detail hereinafter with reference to drawings.

Figure 1:
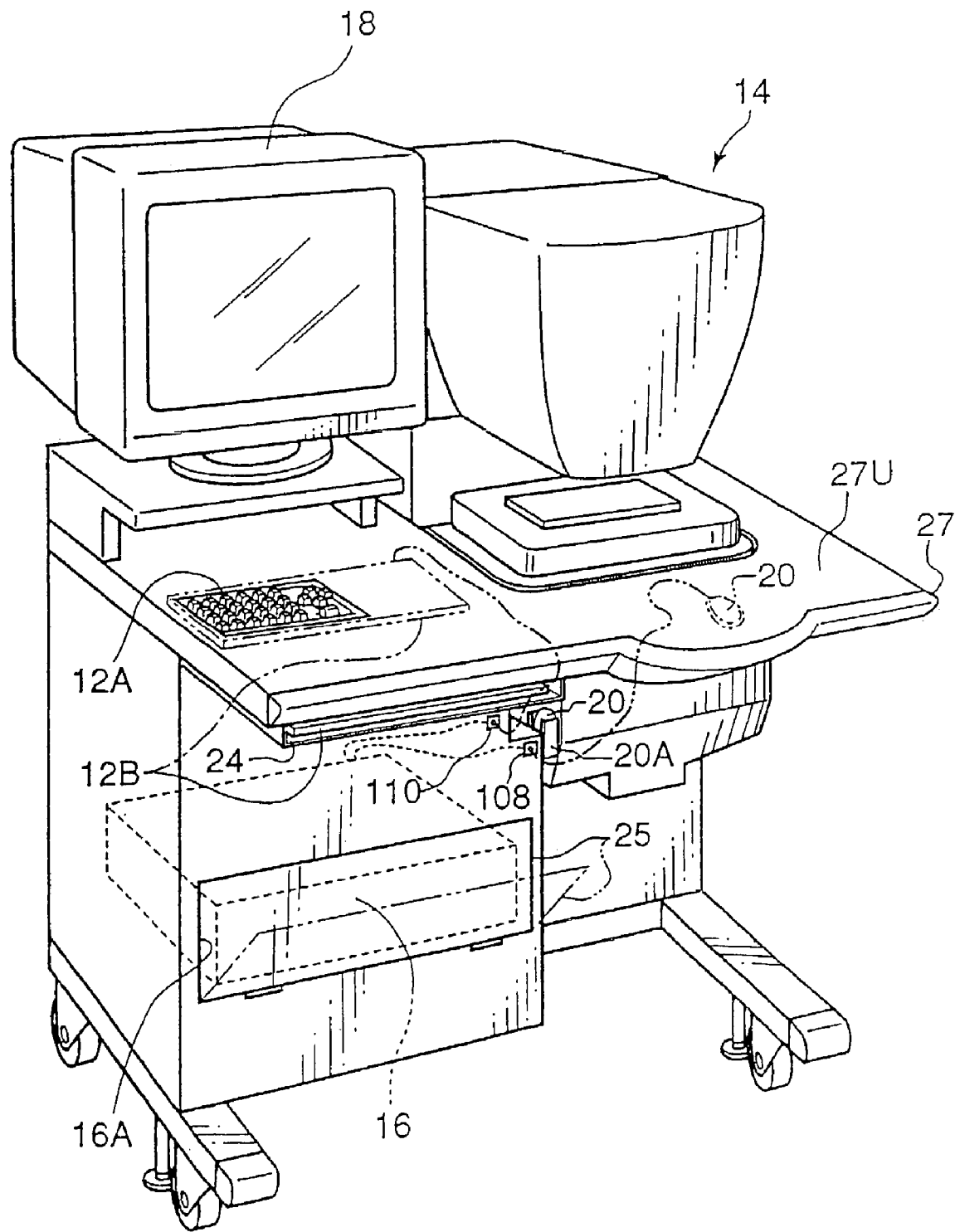
FIG. 1 is an external view of an area CCD scanner.

As illustrated in FIG. 1, an image reading apparatus of the present embodiment is provided with an area CCD scanner 14. The area CCD scanner 14 has a work table 27 at which are provided an image processing section 16, a mouse 20, two keyboards 12A, 12B, and a display 18.

One of the keyboards 12A is embedded in a work surface 27U of the work table 27. The other keyboard 12B is stored in a drawer 24 of the work table 27 when not being used, and is removed from the drawer 24 and placed on top of the other keyboard 12A when used. At this time, the cord of the keyboard 12B is connected to a jack 110 connected to the image processing section 16.

A cord of the mouse 20 is connected to the image processing section 16 via a hole 108 formed in the work table 27. The mouse 20 is stored in a mouse holder 20A when not in use, and is removed from the mouse holder 20A and placed on the work surface 27U when used.

The image processing section 16 is accommodated in an accommodation portion 16A provided at the work table 27, and is closed therein by a door 25. When the door 25 is opened, the image processing section 16 can be removed from the accommodation portion 16A.

The area CCD scanner 14 reads a film image recorded on a photographic film such as a negative film, a reversal film, or the like. For example, the area CCD scanner 14 may read the film images of a 135 size photographic film, a 110 size photographic film, a photographic film on which a transparent magnetic layer is formed (a 240 size photographic film which is known as an APS film), and 120 size and 220 size (brownie size) photographic films. The area CCD scanner 14 reads, by an area CCD, the film image which is to be read, and outputs the image data.

The photographic film described herein is a film on which an object is photographed, to which developing process is subject, and in which a negative image or a positive image recorded thereon is visualized.

Image data outputted from the area CCD scanner 14 is inputted to the image processing section 16. Image processings such as various types of correction are carried out on the inputted image data, and the processed data is outputted to a laser printer section (not shown) as image data for recording.

Figure 2:
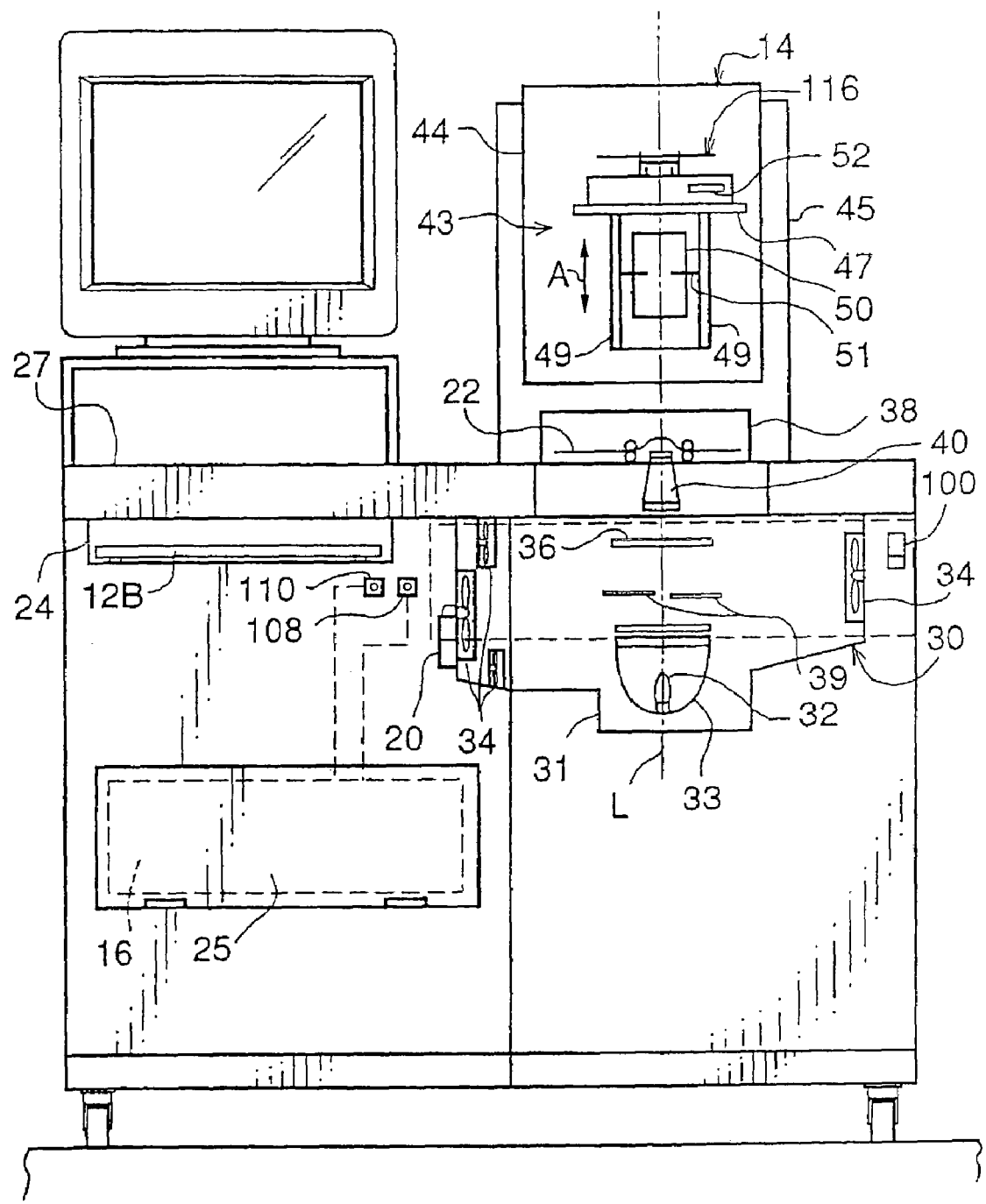
FIG. 2 is a front cross sectional view of an optical system of the area CCD scanner.
Figure 3:
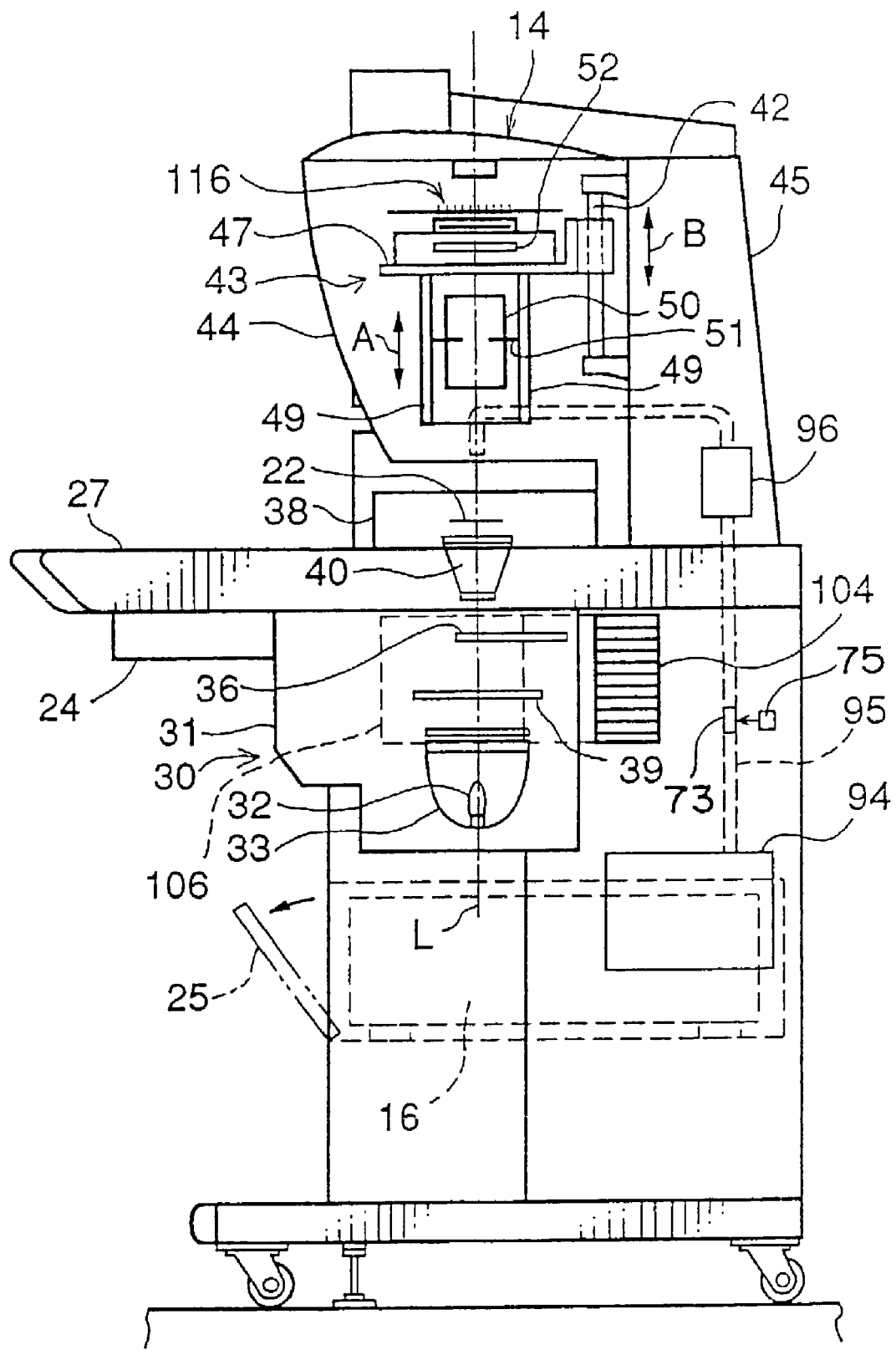
FIG. 3 is a side cross sectional view of the optical system of the area CCD scanner

As shown in FIGS. 2 and 3, the optical system of the area CCD scanner 14 is provided with a light source section 30 which is disposed below the work table 27, a diffusion box 40 which is supported at the work table 27, a film carrier 38, serving as a moving device, which is set at the work table 27, and a reading section 43 which is disposed at the side of the work table 27 opposite the side at which the light source section 30 is disposed.

The light source section 30 is accommodated in a metal casing 31. A lamp 32, which is a halogen lamp, a metal halide lamp, or the like, is disposed within the casing 31. Lights emitted from the lamp 32 include a light including wavelength in a visible light region and wavelength in an infrared ray region.

A reflector 33 is provided at the periphery of the lamp 32. A portion of the light emitted from the lamp 32 is reflected by the reflector 33, so as to be emitted in a given direction. Plural fans 34 are provided at the sides of the reflector 33. The fans 34 are operated while the lamp 32 is lit, so as to prevent the interior of the casing 31 from overheating.

A diaphragm 39 and a turret 36 are disposed along the optical axis L of the light emitted (reflected) from the reflector 33 in that order at the side of the reflector 33 from which light is reflected. The diaphragm 39 adjusts the amount of the light from the lamp 32 and the amount of light reflected by the reflector 33. The turret 36 changes color component of light arrived at the photographic film 22 and the reading section 43. The turret 36 comprises four filters, that is, a filter 36C, a filter 36M, a filter 36Y and a filter 36IR, which are fitted therein. The filter 36C transmits only a light in a wavelength region corresponding to a red light among the incident lights (that is, a R-light). The filter 36M transmits only a light in a wavelength region corresponding to a green light among the incident lights (that is, a G-light). The filter 36Y transmits only a light in a wavelength region corresponding to a blue light among the incident lights (that is, a B-light). The filter 36IR transmits only a light in a wavelength region corresponding to an infrared among the incident lights (that is, an IR-light). The turret 36 can be rotated in a direction shown by an arrow t in FIG. 4B.

Figure 4A:
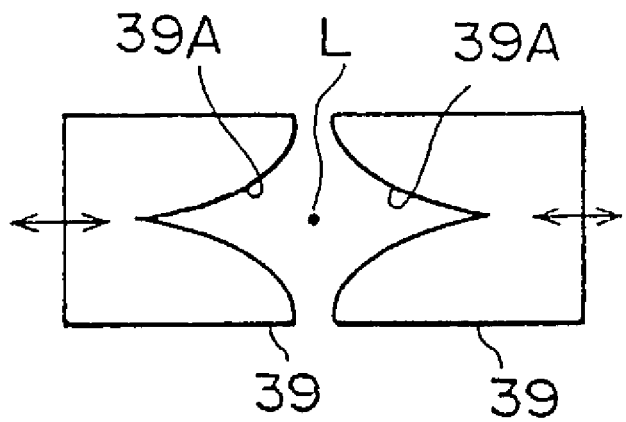
FIG. 4A is a plan view illustrating an example of a diaphragm.
Figure 4B:
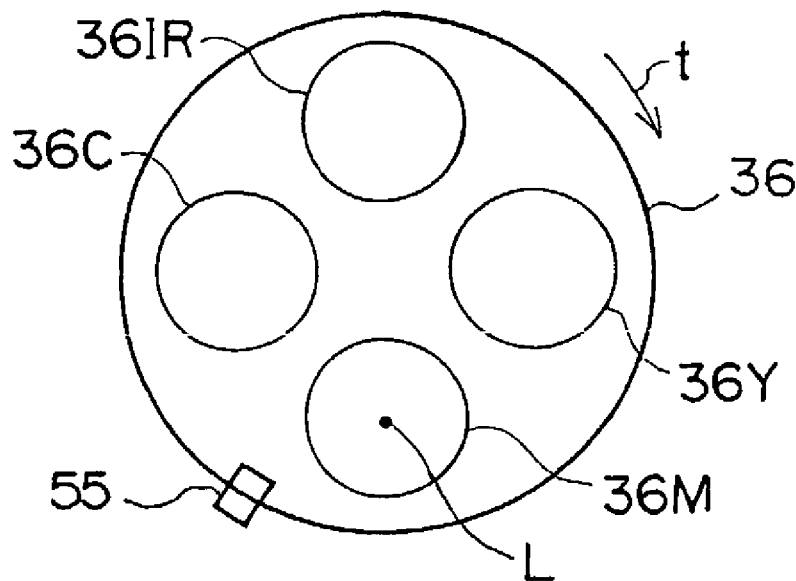
FIG. 4B is a plan view illustrating an example of a turret.

The diaphragm 39 is formed from a pair of plate-like members (diaphragm plates) which are disposed on either side of the optical axis L and are able to slide both toward and away from each other. As shown in FIG. 4A, a cutout section 39 is formed in an end section of each of the pair of plate-like members of the diaphragm 39, so that the cross-sectional surface area along a direction perpendicular to the sliding direction changes continuously from one sliding direction end of the plate-like member to the other sliding direction end thereof. The plate-like members are disposed such that the sides in which the cutout sections 39A are formed face each other.

In the above structure, one of the filters (36C, 36M, 36Y and 36IR) is positioned on the optical axis L so as to obtain light of the desired light component when an image frame of the photographic film 22 is read. The amount of the light passing through the diaphragm 39 is adjusted to a desired light amount by the position of the diaphragm 39.

The light which enters the diffusion box 40 is made into diffused light by the diffusion box 40 and light diffusing plates, not shown in the drawings, which are disposed in a light incident side of the diffusion box 40 and a light exiting side of the diffusion box 40, respectively. In this way, by making the light which exits from the diffusion box 40 diffused light, there is less unevenness of the amount of light illuminated onto the photographic film 22, and the light with an uniformed light amount is irradiated on the film image. Note that the diffusion box 40 described above is for the 135 size photographic film, but diffusion boxes, not shown in the drawings, having configurations according to other types of photographic films, are equipped.

Figure 7:
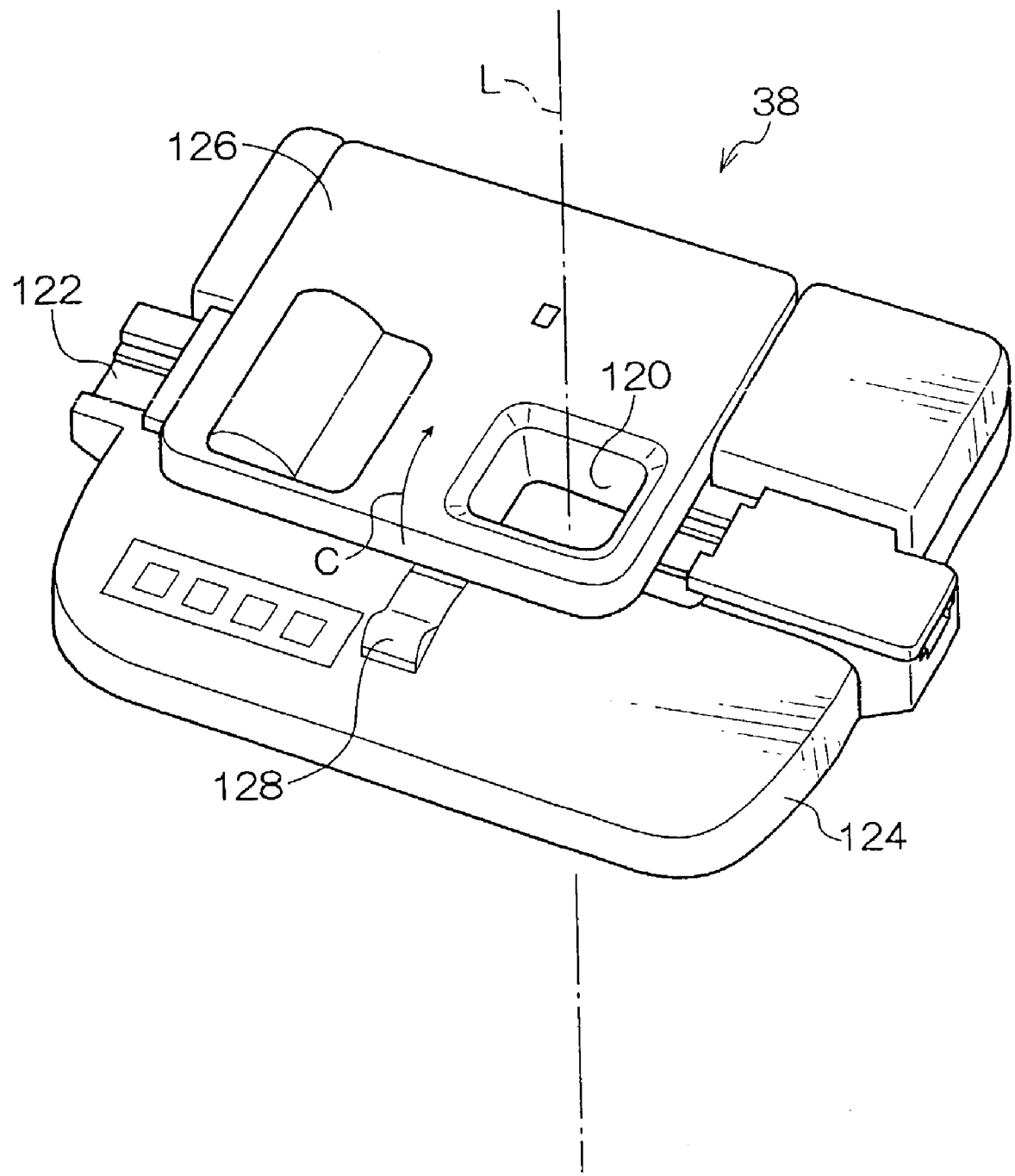
FIG. 7 is an external view of a film carrier.

As shown in FIG. 7, an opening 120 having a rectangular configuration is provided at a position corresponding to the optical axis L of the film carrier 38. The light from the diffusion box 40 is irradiated onto the photographic film 22 set on a film conveying path 122 of the film carrier 38 via the opening 120. The light transmitted through the photographic film 22 is reached the reading section 43. Further, a cover for opening and closing 126, whose rear end side in FIG. 7 is axially supported at the carrier main body 124, can be lock-released by operation of an operating lever 128, and can be opened in a direction shown by an arrow C in FIG. 7.

The diffusion box 40 is supported such that the top surface thereof is near at a lower portion of the opening 120 mentioned above. Thus, a cut-out portion is provided in the bottom surface of the film carrier 38 so that the film carrier 38 and the diffusion box 40 do not interfere with each other when the film carrier 38 is loaded.

The reading section 43 is accommodated within a casing 44. A loading stand 47, on whose top surface a area CCD 116 is mounted, is provided within the casing 44. A plurality of lens cylinders 49 hang downward from the loading stand 47. A lens unit 50 is supported within the lens cylinder 49. The lens unit 50 is slidable in the directions of arrow A so as to approach and move away from the work table 27 in order to adjust the magnification (e.g., reduction, enlargement).

A support frame 45 is provided at the work table 27. The loading stand 47 is supported by a guide rail 42 which is mounted to the support frame 45, such that the loading stand 47 is slidable in directions of approaching and moving away from the work table 27 in order to ensure the conjugate length when the magnification is changed or during autofocusing.

Figure 4C:
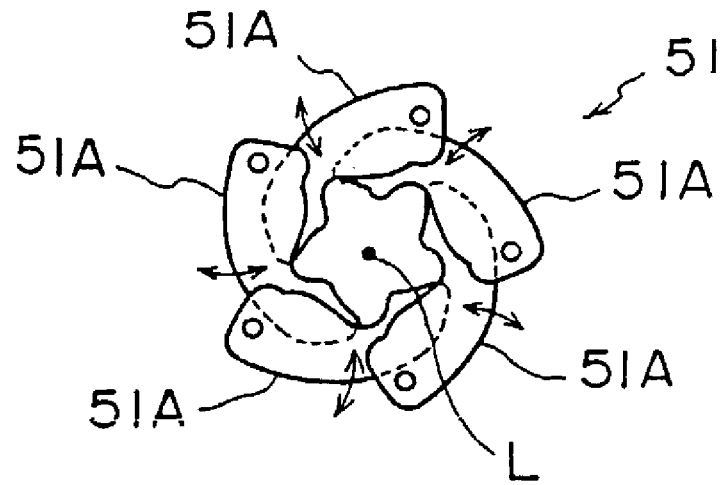
FIG. 4C is a plan view illustrating an example of a lens diaphragm.

The lens unit 50 is formed from plural lenses, and a lens diaphragm 51 is provided between the plural lenses. As shown in FIG. 4C, the lens diaphragm 51 is provided with plural diaphragm plates 51A which are each formed in a substantially C-shaped configuration. The diaphragm plates 51A are disposed uniformly around the optical axis L. At each diaphragm plate 51A, one end portion thereof is supported by a pin such that the diaphragm plate 51A can rotate around the pin. The plurality of diaphragm plates 51A are connected to each other via an unillustrated link, and rotate in the same direction when driving force is transmitted from a lens diaphragm driving motor (which will be described later). As the diaphragm plates 51A rotate, the surface area of the portion which is not cut off from light by the diaphragm plates 51A (the substantially star-shaped portion in FIG. 4C) is changed around the optical axis L such that the amount of light which passes through the lens diaphragm 51 changes.

In the area CCD 116, a many number of photoelectric converting elements such as CCD cells, photodiodes or the like, having sensitivity in the visible light regions and the infrared light region, respectively, are provided and arranged in a matrix configuration. It is monochromatic CCD. The area CCD 116 is provided such that a receiving surface of the area CCD 116 substantially coincides with an image focus point position of the lens unit 50. A CCD shutter 52 is provided between the area CCD 116 and the lens unit 50.

As shown in FIG. 3, a compressor 94 for generating cooling air for cooling the photographic film 22 is disposed at the working table 27. The cooling air generated by the compressor 94 is guided and supplied to a reading section (not shown) of the film carrier 38 by a guide tube 95. The guide tube 95 passes through a flow rate sensor 96 which detects the flow rate of the cooling air. Consequently, the region of the photographic film 22 positioned at the reading section can be cooled. The flow rate sensor 96 can be substitute by another sensor, such as a sensor which detects wind velocity of the cooling air, a sensor which detects pressure of the cooling air, or the like.

Figure 5:
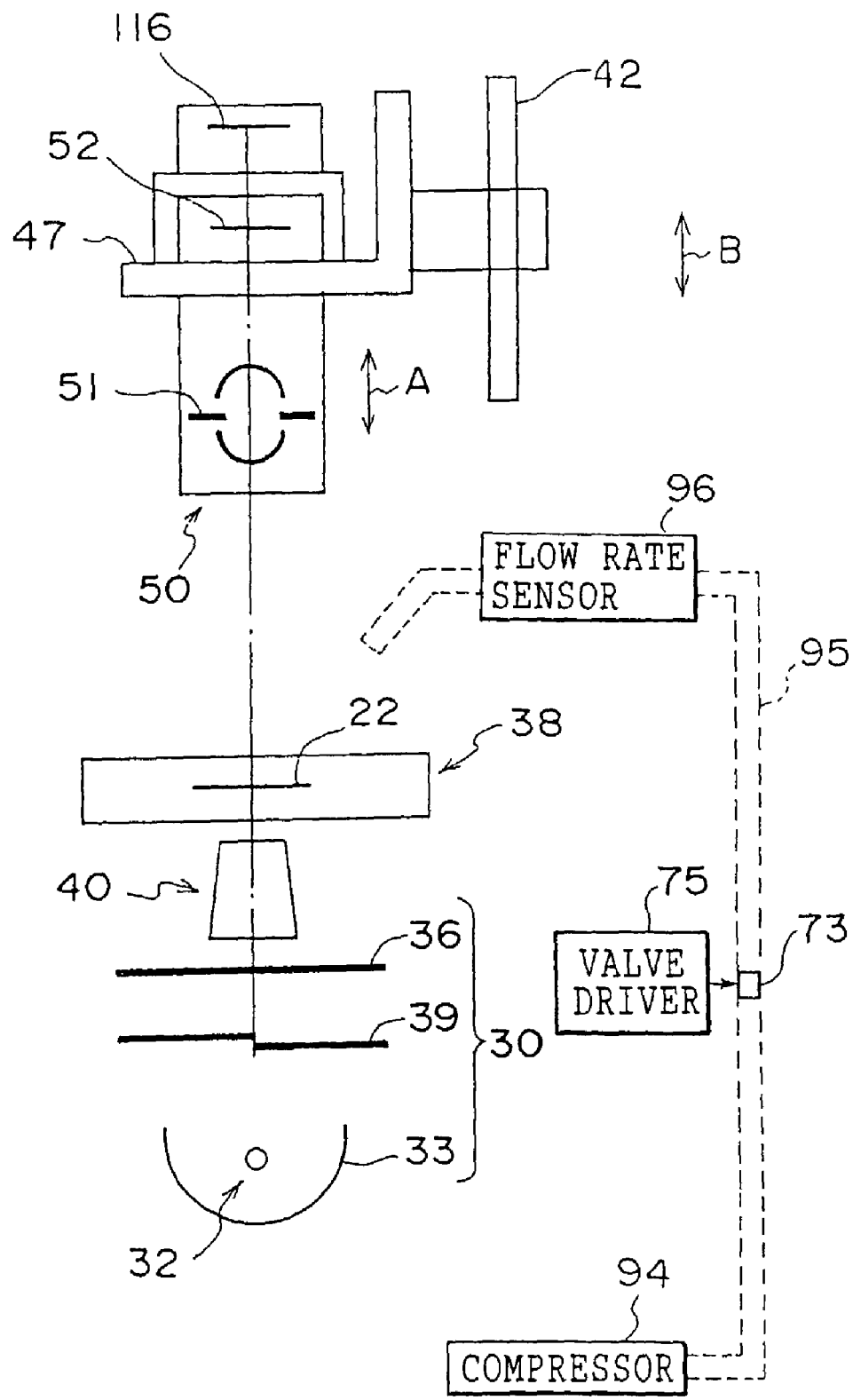
FIG. 5 is a schematic view illustrating only main portions of the optical system of the area CCD scanner.
Figure 6:
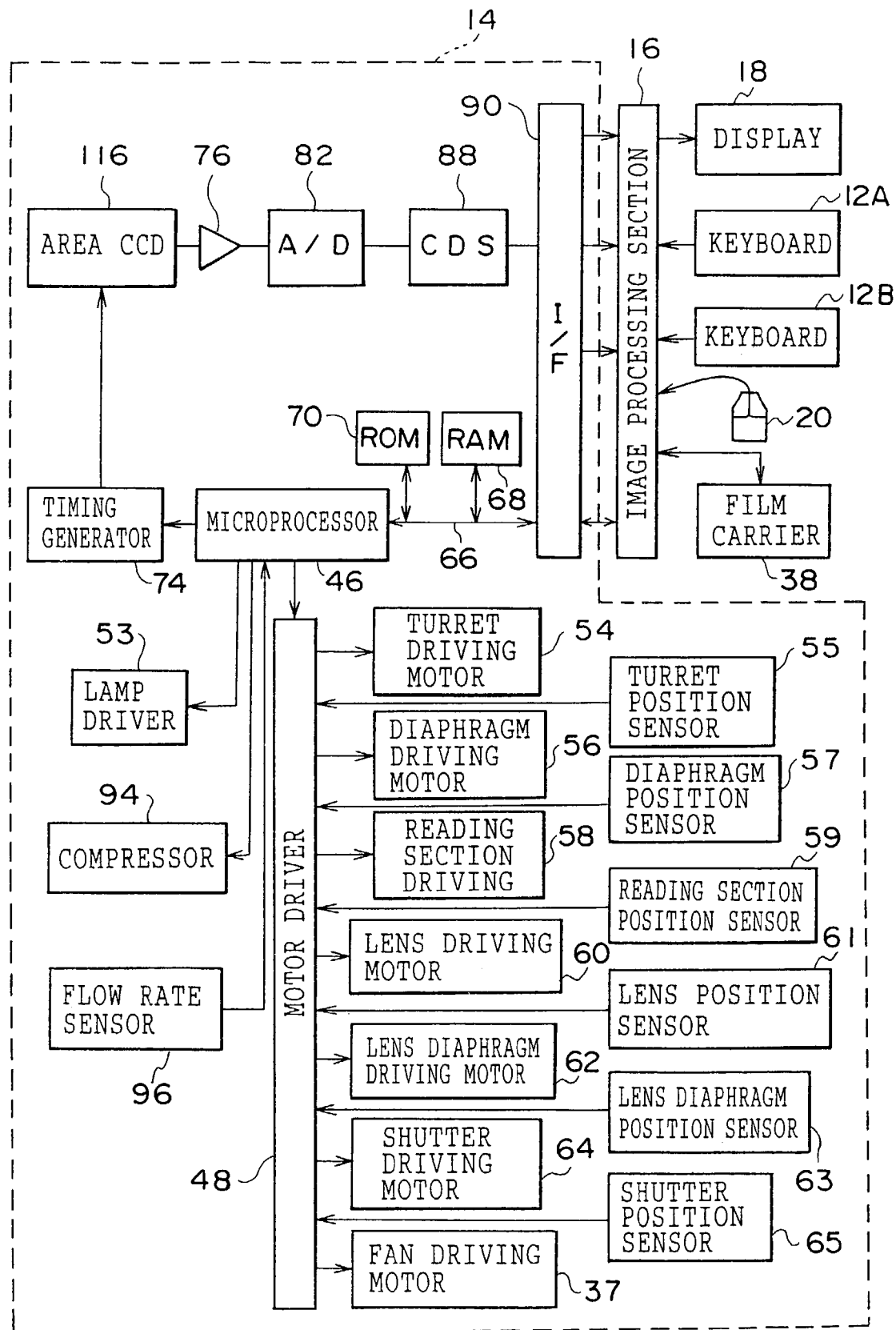
FIG. 6 is a block diagram illustrating a schematic structure of an electrical system of the area CCD scanner.

The schematic structure of the electrical systems of the area CCD scanner 14 and the image processing section 16 will be described hereinafter on the basis of FIG. 6, with reference to FIG. 5 which illustrates the main portions of the optical system of the area CCD scanner 14.

The area CCD scanner 14 has a microprocessor 46 which governs the overall control of the area CCD scanner 14. A RAM 68 (e.g., an SRAM) and a ROM 70 (e.g., a ROM whose stored contents are rewritable) are connected to the microprocessor 46 via a bus 66. A lamp driver 53, the compressor 94, the flow rate sensor 96, and a motor driver 48 are connected to the microprocessor 46. The lamp driver 53 turns the lamp 32 on and off in accordance with instructions from the microprocessor 46. When the film image of the photographic film 22 is being read, the microprocessor 46 operates the compressor 94 to supply cooling air to the photographic film 22. The flow rate of the cooling air is detected by the flow rate sensor 96, and the microprocessor 46 senses abnormalities.

A turret driving motor 54 and a turret position sensor 55 (see FIG. 4B) are connected to the motor driver 48. The turret driving motor 54 drives the turret 36 to rotate in the direction of arrow t in FIG. 4B such that one of the filters 36C, 36M, 36Y and 36IR of the turret 36 is positioned on the optical axis L. The turret position sensor 55 detects a reference position (an unillustrated cut-out) of the turret 36.

Also connected to the motor driver 48 are a diaphragm driving motor 56 for sliding the diaphragm 39, a diaphragm position sensor 57 which detects the position of the diaphragm 39, a reading section driving motor 58 which slides the loading stand 47 (i.e., the area CCD 116 and the lens unit 50) along the guide rail 42, a reading section position sensor 59 for detecting the position of the loading stand 47, a lens driving motor 60 which slides the lens unit 50 along the lens cylinder 49, a lens position sensor 61 for detecting the position of the lens unit 50, a lens diaphragm driving motor 62 for rotating the diaphragm plates 51A of the lens diaphragm 51, a lens diaphragm position sensor 63 for detecting the position of the lens diaphragm 51 (the positions of the diaphragm plates 51A), a shutter driving motor 64 for switching the CCD shutter 52 between the completely closed state, the completely open state, and the light-reducing state, a shutter position sensor 65 for detecting the position of the shutter, and a fan driving motor 37 for driving the fans 34.

When image reading of the photographic film 22 is carried out by the area CCD 116, on the basis of the positions of the turret 36 and the diaphragm 39 detected by the turret position sensor 55 and the diaphragm position sensor 57, the microprocessor 46 rotates the turret 36 by the turret driving motor 54 and slides the diaphragm 39 by the diaphragm driving motor 56 so as to adjust the light illuminated onto the film image.

The microprocessor 46 determines the zoom magnification in accordance with the size of the film image, whether trimming is to be carried out, and the like. The microprocessor 46 slides the loading stand 47 by the reading section driving motor 58 on the basis of the position of the loading stand 47 detected by the reading section position sensor 59, so that the film image is read by the area CCD 116 at the determined zoom magnification. Further, the microprocessor 46 slides the lens unit 50 by the lens driving motor 60 on the basis of the position of the lens unit 50 detected by the lens position sensor 61.

When focussing control to make the light-receiving surface of the area CCD 116 coincide with the film image image-forming position by the lens unit 50 is carried out (i.e., when auto focusing control is carried out), the microprocessor 46 slides only the loading stand 47 by the reading section driving motor 58. This focussing control can be carried out such that, for example, the contrast of the film image read by the area CCD 116 is a maximum (what is known as the image contrast method). Alternatively, a distance sensor which measures by infrared rays or the like the distance between the photographic film 22 and the lens unit 50 (or the area CCD 116) may be provided, and focussing control can be carried out on the basis of the distance detected by the distance sensor instead of on the basis of the data of the film image.

As the result, the lights in wavelengths corresponding to respective filters 36C, 36M, 36Y and 36IR (R, G, B,IR) are irradiated on the image recording region on the photographic film 22 in that order. Each light transmitted through the image recording region on the photographic film 22 is detected by the area CCD sensor 116 (concretely, photoelectric converted) and outputted from the area CCD sensor 116 as a signal representing transmitted amount of the light.

The transmitted amounts of the lights in respective wavelength regions of R, G and B change in accordance with respective R, G and B densities of the image recorded on the image recording region. Also, the transmitted amounts of the lights in respective wavelength regions of R, G and B change due to a blemish on the photographic film 22, a defect adhered to the photographic film 22, a dust on the optical path, or the like. However, the transmitted amount of the light of IR is not affected by the density of the image, but affected by only a blemish, defect and the like.

On the other hand, a timing generator 74 is connected to the area CCD 116. The timing generator 74 generates various types of timing signals (clock signals) for operating the area CCD 116, an A/D converter 82 which will be described later, and the like. The signal output terminal of the area CCD 116 is connected to the A/D converter 82 by an amplifier 76. The signal outputted from the area CCD 116 is amplified by the amplifier 76 and is converted into digital data at the A/D converter 82.

The output terminal of the A/D converter 82 is connected to the image processing section 16 via a correlation double sampling circuit (CDS) 88 and an interface (I/F) circuit 90 in that order. At the CDS 88, feedthrough data which expresses the level of a feedthrough signal and pixel data expressing the level of a pixel signal are respectively sampled, and the feedthrough data is subtracted from the pixel data for each pixel. The CDS 88 successively outputs the results of calculation (pixel data which accurately corresponds to the amount of accumulated charge in each CCD cell) to the image processing section 16 via the I/F circuit 90 as scan image data.

The display 18, the keyboards 12A, 12B, the mouse 20 and the film carrier 38 are connected to the image processing section 16.

Figure 8:
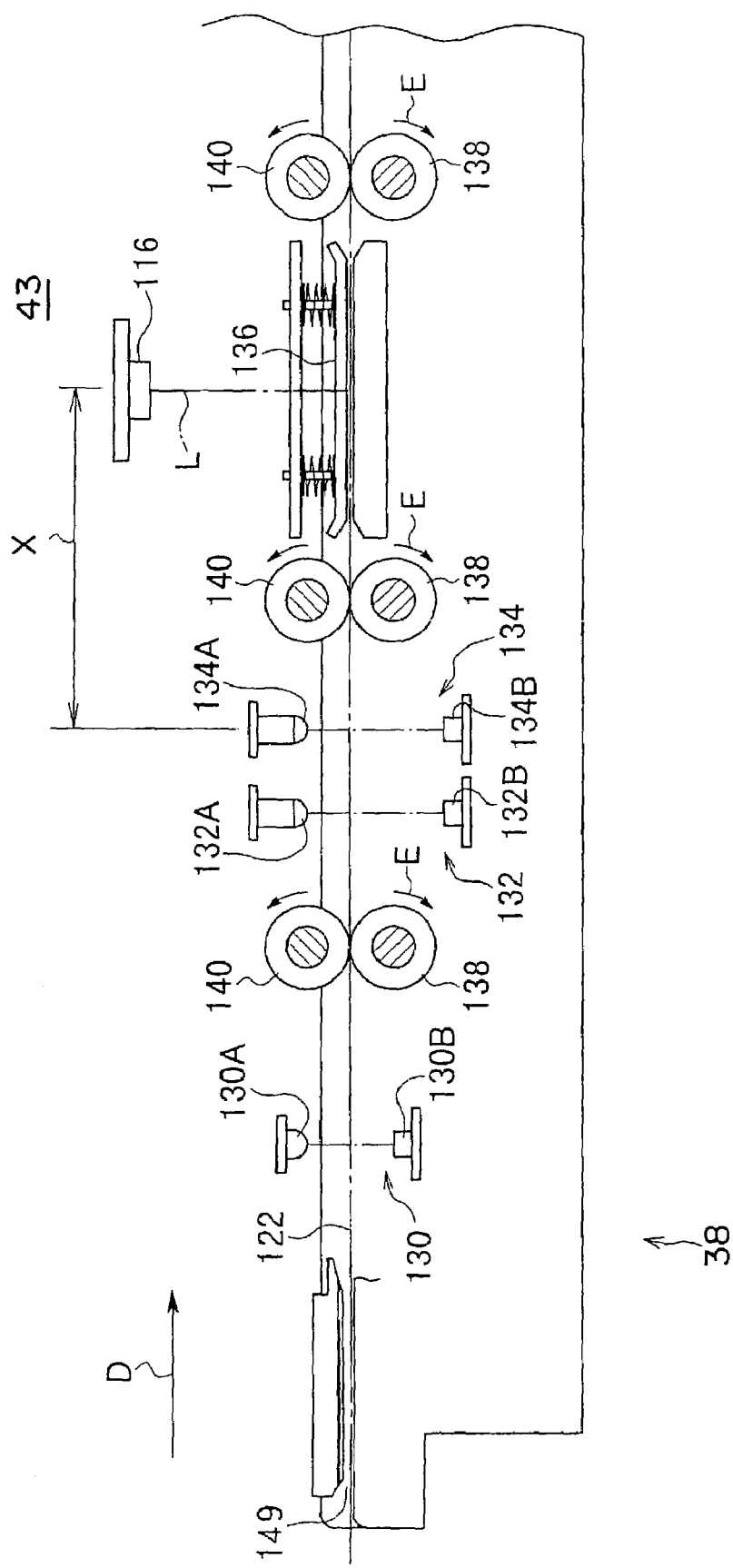
FIG. 8 is a schematic view illustrating relationship among each type of sensors and a pressing plate provided in the film carrier shown in FIG. 7.

As shown in FIG. 8, in the film carrier 38, a loading sensor 130, a fogging portion detecting sensor 132 and a frame position detecting sensor 134 are provided along a conveying direction (shown by an arrow D in FIG. 8) of the photographic film 22 in that order from an upper stream side of the conveying direction. The loading sensor 130 comprises a LED 130A disposed at an upper side of the film conveying path 122 and a PD130B disposed at an lower side of the film conveying path 122 and facing the LED 130A. The fogging portion detecting sensor 132 comprises a LED 132A disposed at the upper side of the film conveying path 122 and a PD132B disposed at the lower side of the film conveying path 122 and facing the LED 132A. The frame position detecting sensor 134 comprises a LED 134A disposed at the upper side of the film conveying path 122 and a PD134B disposed at the lower side of the film conveying path 122 and facing the LED 134A. Each of the sensors 130, 132 and 134 are connected to the microprocessor 46 within the area CCD 14 so as to be controlled by the microprocessor 46, and detection information (increasing or decreasing of the transmitted light amount varying in accordance with the density of the photographic film) detected by the respective sensors 130, 132 and 134 is sent to the microprocessor 46.

Further, in the present embodiment, a plurality of the fogging portion detecting sensors 132 are arranged along a width direction of the film conveying path 122, which is orthogonal to the film conveying direction. The plurality of the fogging portion detecting sensors 132 detect an image density of the image recorded region of the film 22 and image non-recorded regions located both ends of the film 22. A distance X in the film conveying direction between the optical axis L of the reading section 43 and the frame position detecting sensor 134 is set to about 95 mm which corresponds to a length of 2.5 frames of the 135 size photographic film.

A pressing plate 136 is provided on the optical path L. The pressing plate 136 can move between a position of the reading region at which the photographic film 22 is read by the area CCD 116 and a position which is apart from the position of the reading region at the area CCD side. An opening corresponding to the reading region is formed on the pressing plate 136. When the pressing plate is positioned at the above mentioned position of the reading region and presses the photographic film 22, flat state of the photographic film 22 is secured.

A driving roller 138 and a driven roller 140 are provided between the loading sensor 130 and the fogging portion detecting sensor 132. Further, driving rollers 138 and driven rollers 140 are provided at the upstream side of the pressing plate 136 and the downstream side of the pressing plate 136, respectively. The driving rollers 138 are located at the lower side of the film conveying path 122 and the driven roller 140 are located at the upper side of the film conveying path 122 and contact respective driving rollers 138. Rotation driving force is transmitted to the driving roller 138 from a roller driving motor (a pulse motor) not shown in the drawings. The roller driving motor is connected to the microprocessor 46 via the motor driver 48. The driving roller 138 (the roller driving motor) is driven to rotate on the basis of a pulse signal from the motor driver 48.

Figure 9:
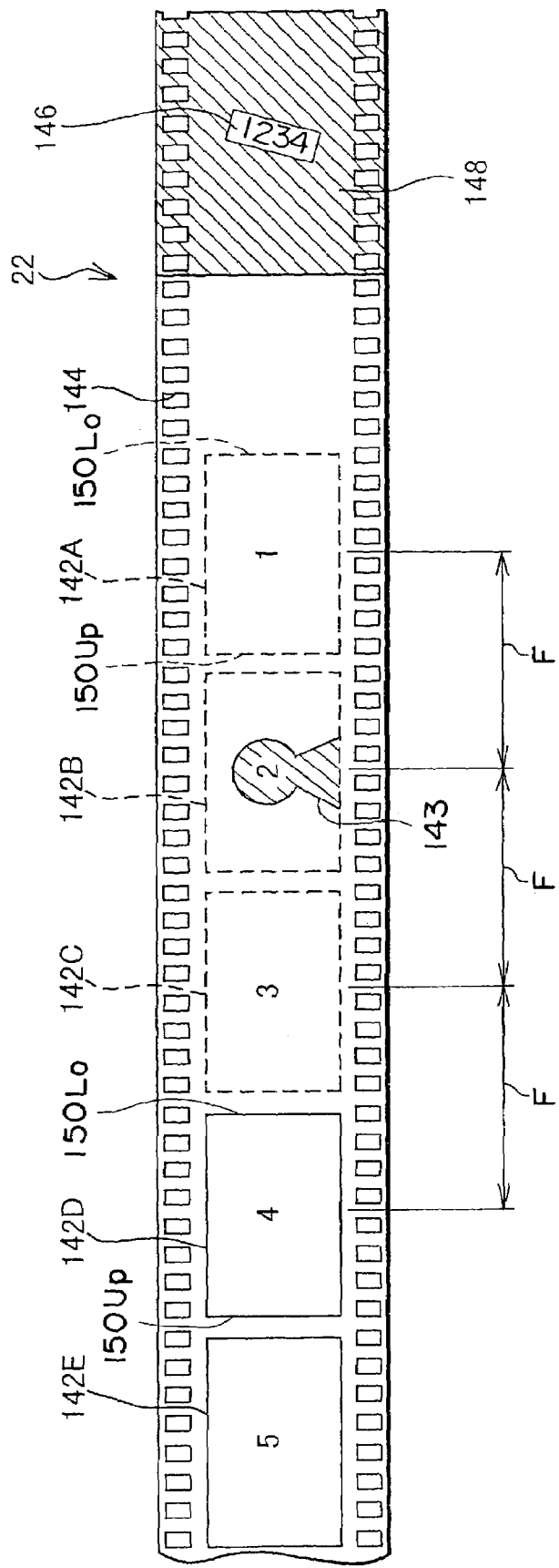
FIG. 9 is a plan view illustrating an example of a photographic film.

As shown in FIG. 9, a plurality of image frames 142 (142A, 142B, 142C, 142D . . . ) are recorded on the photographic film 22. Bar codes (not shown in the drawings) and perforations 144 specifying positions of the image frames 142 are formed on the photographic film 22 at both ends in the film width direction so as to correspond to respective image frames 142. The perforations 144 specify concrete positions of the respective image frames 142. Each bar code specifies, for a corresponding image frame, the number of image frames from an image frame located at the leading position the corresponding image frame is located.

The photographic film 22 described here is the 135 size photographic film, and a check tape 146 is stuck to the photographic film 22 in the vicinity of a leading end of the photographic film 22. The check tape 146 is stuck to the photographic film for the purpose of distinguishing from other photographic films, and an identification number is written thereon. The check tape 146 is stuck to the leading end of the photographic film 22, which is drawn a little from a cartridge thereof, before developing process. Accordingly, the drawn portion of the photographic film 22 is exposed very much. Therefore, a fogging portion 148 is formed on the leading end region of the photographic film 22, which fogging portion 148 has the maxim density after the developing process.

Further, in a case shown in FIG. 9, a leading image frame 142A and a third image frame 142C are in an underexposure state due to a night view or fireworks being photographed, therefore, frame edges of the leading image frame 142A and the third image frame 142C are not clear. A subject image 143 is recorded on a second image frame 142B. The subject image 143 is photographed by using a slow synchro mode (a night view portrait mode). The slow synchro mode is a mode in which a person and a night view are photographed in balancing condition. However, an image density in a region around the subject image 143 in the second frame 142B is low, namely, frame edges of the second frame 142B are not clear. In a fourth image frame 142D and a fifth image frame 142E, images such as a landscape or the like photographed in a day are recorded.

Next, the image reading of the photographic film 22 by the area CCD scanner 14 which has above described structure will be explained.

Figure 10:
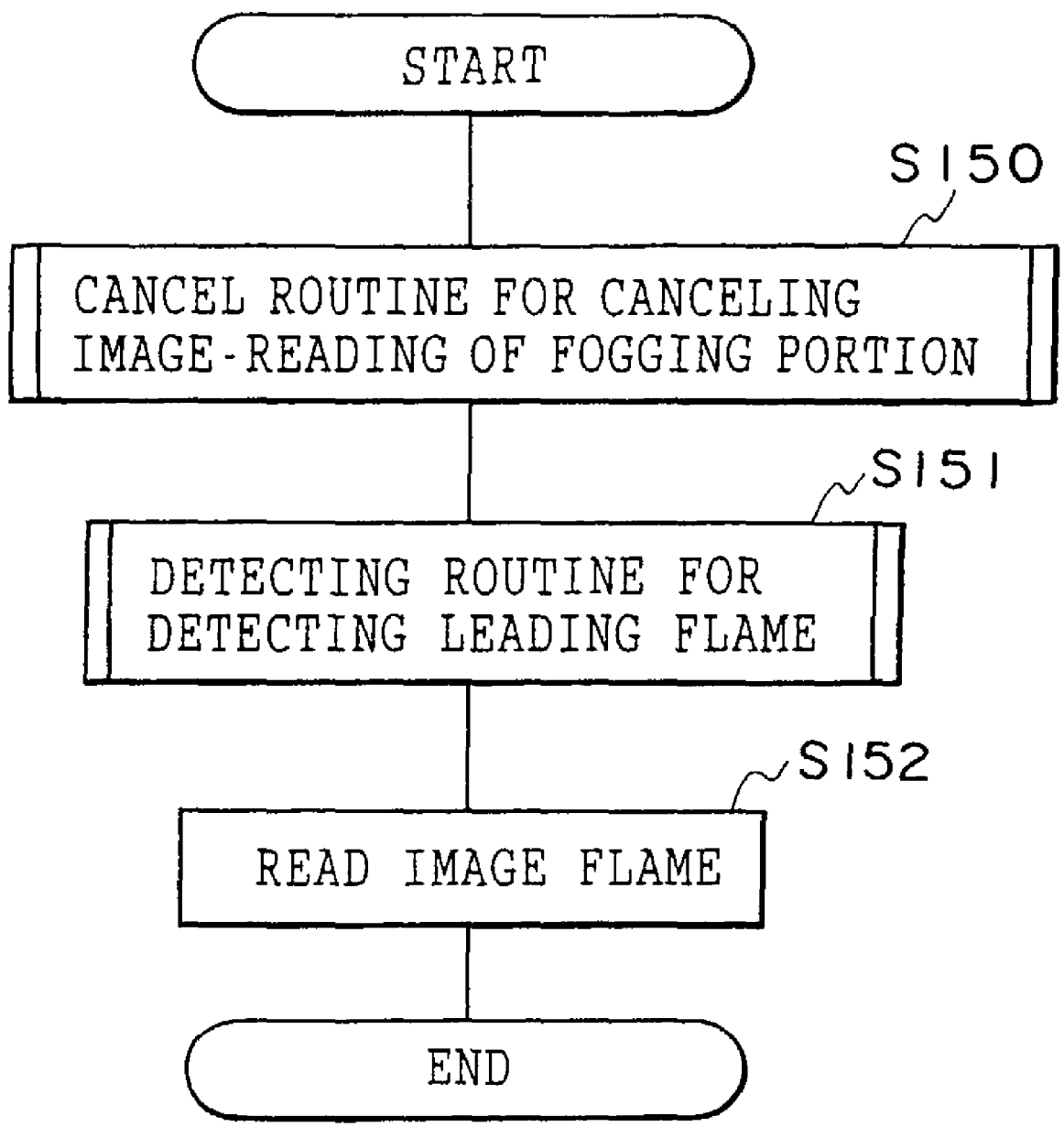
FIG. 10 is a flowchart showing a main routine relating to one embodiment of the present invention.

As shown in FIG. 10, a main routine of the CCD scanner 14 relating to the present embodiment is shown. The present routine is started when the photographic film 22 is loaded on the film carrier 38 and a start key (not shown in the drawings) is made to be ON. When the leading end of the photographic film 22 which is inserted into the film inserting opening 149 (see FIG. 8) of the film carrier 38 is detected by the loading sensor 130, the driving roller 138 is driven to rotate in a direction of an arrow E shown in FIG. 8 and the driven roller 140 is made to rotate due to rotation of the driving roller 138. Thus, the photographic film 22 is conveyed to a direction shown by the arrow D. Then, in step 150, a cancel routine for canceling reading of an image of the fogging portion 148 is carried out, and in the step 152, reading of the image frames is carried out.

Figure 11:
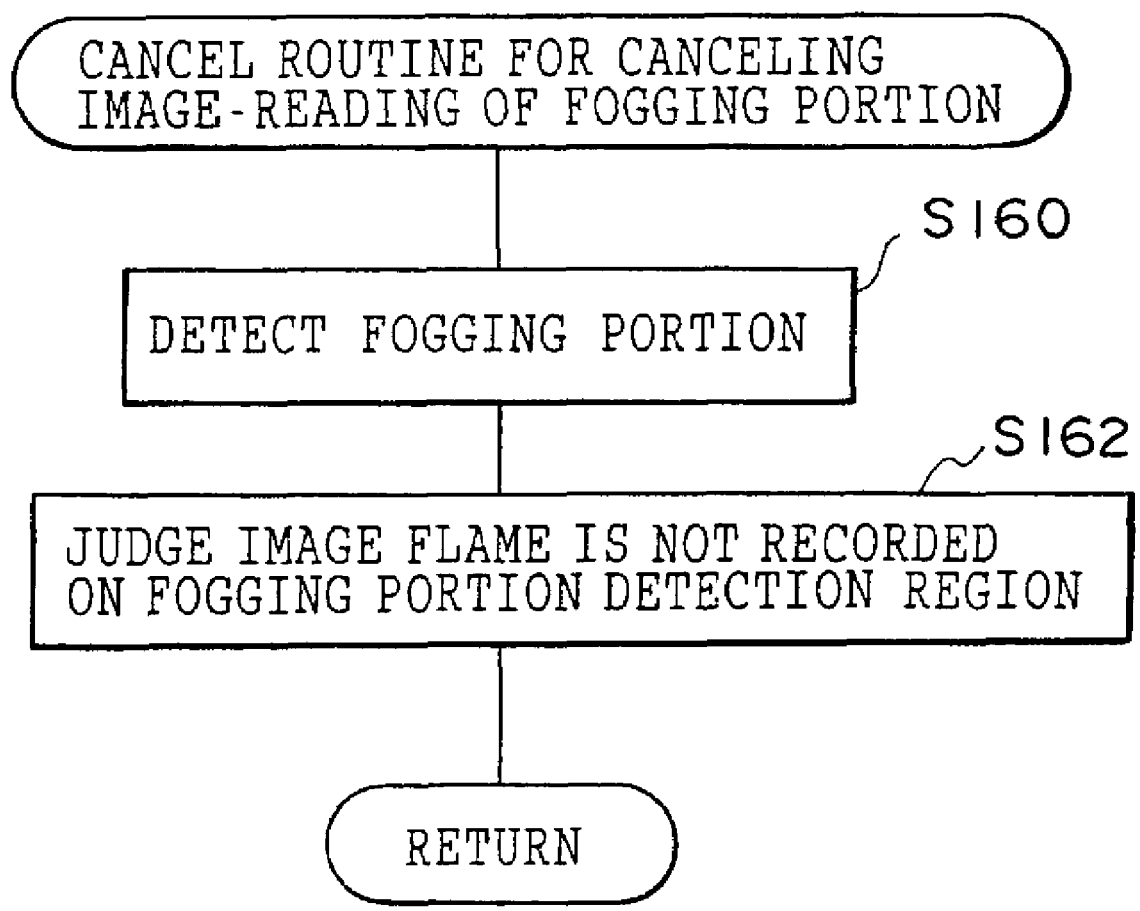
FIG. 11 is a flowchart showing a cancel routine for canceling image-reading of fogging portion in step 150 shown in FIG. 10

Next, referring to FIG. 11, the cancel routine (the step 150) for canceling reading of image on the fogging portion will be explained. When the photographic film 22 conveyed on the film conveying path 122 is arrived at the fogging portion detecting sensor 132 and the frame position detecting sensor 134, in step 160, the fogging portion 148, which is located at the leading edge side of the fogging portion, is detected by the fogging portion detecting sensor 132 while the photographic film 22 is conveyed, on the basis of the transmission light amount in accordance with the densities of the image recorded region of the photographic film 22 and the image non-recorded regions located both ends in the width direction of the photographic film 22. In step 162, it is judged by the microprocessor 46 that the frame image is not recorded on the detected fogging region, and the present routine is ended.

In the present embodiment, by the fogging portion detecting sensors 132 provided at the film conveying path 122 in the width direction, bar codes formed on the photographic film 22 at both ends in the width direction of the film are read at the same time. Namely, the fogging portion detecting sensors 132 also functions as a bar code detecting sensor.

Due to the cancel routine for canceling reading of image on the fogging portion, it is prevented that the checking tape 146 located at the fogging portion 148 is specified erroneously as the leading image frame. Therefore, the leading image frame is correctly specified even though a dedicated sensor or the like for detecting the checking tape is not used. Accordingly, correct image reading from the leading image frame of the photographic film 22 can be realized by a simple structure.

Next, when the cancel routine for canceling reading of image on the fogging portion is ended, namely, when the fogging portion 148 of the photographic film 22 pass through the fogging portion detecting sensors 132, the leading frame detecting routine, which detects the leading frame of the photographic film 22 by the frame position detecting sensor 134, is executed However, in a case in which frame edges of a plurality of the successive image frames from the leading image frame are not clear, such as shown by the photographic film 22 in FIG. 9, it is impossible to specify a position of the leading image frame on the basis of information of densities of image frames successive from the second image frame detected by the frame position detecting sensor 134. Therefore, in the conventional art, in a case in which three or more image frames cannot be detected, conveyance of the photographic film is automatically stopped. Then, an operator conveys the photographic film by a manual operation (a feeding-key operation) such that a central portion of the leading image frame coincides with the optical axis L of the reading section 43, while checking a projected image of the image frame displayed on a display 18. In order to delete such annoyance operation, in reading of image on the photographic film of the present embodiment, the leading frame detecting routine which automatically positions the leading image frame at the image reading section.

Next, referring to FIG. 12, the leading image frame detecting routine (a step 151) will be explained. In a step 170, a variable N which counts a number of the image frame is initialized. In a step 172, the variable N is increment by 1. In a step 174, an image density of the leading image frame is detected by the frame position detecting sensor 134 while the photographic film 22 is conveyed.

Next, in a step 176, it is judged whether or not the frame position detecting sensor 134 can detect the image density of the leading image frame. In a case in which the frame position detecting sensor 134 can detect the image density of the leading image frame during the photographic film 22 being conveyed in a predetermined distance, it is judged to be normal and the process proceeds to a step 178. In a case in which the frame position detecting sensor 134 cannot detect the image density of the leading image frame, it is judged to be abnormal and the process proceeds to a step 172.

In the step 178, it is judged whether or not there is fogging formed on the image frame. It is judged by detecting the transmitted light amounts in accordance with the densities at the both ends of the photographic film 22. In a case in which the fogging portion is not formed on the image frame, it is judged to be normal and the process proceeds to a step 180. In a case in which the fogging portion is formed on the image frame, it is judged to be abnormal and the process proceeds to a step 172.

In the step 180, a frame edge 150Lo of the leading frame image 142A at the down stream side in the conveying direction and a frame edge 150Up of the leading frame image 142A at the up stream side in the conveying direction are detected on the basis of the detection information of image density (transmit-density distribution) obtained from the frame position detecting sensor 134. From the detection information, the micro processor 46 specifies the recorded position of the leading image frame 142A. In a case in which the recorded position of the image frame can be specified, it is judged to be normal and the process proceeds to a step 182. In a case in which the recorded position of the image frame cannot be specified during the photographic film 22 being conveyed in the predetermined distance due to the frame edge of the image frame, such as an image frame on which a fireworks are photographed, being not clear, it is judged to be abnormal and the process proceeds to a step 172.

Accordingly, in a case in which it is judged to be normal at all the steps 176, 178 and 180, because the variable N is still count 1 which represents the first image frame, the determination is affirmative in the step 182. Then, the process proceeds to a step 190.

On the other hand, in a case in which it is judged to be abnormal at anyone of the steps 176, 178 and 180, the variable N is increment by 1 and the steps 176, 178 and 180 are carried out in the similar way described above while the photographic film 22 is conveyed in the step 174. Namely, it is judged whether or not the image density of an image recorded region on which the second flame image is supposed to be recorded can be detected, it is judged whether or not there is fogging formed on the image frame (image recorded region), and it is judged whether or not the recorded position of the image frame can be specified. The steps 176, 178 and 180 are repeated until it is judged to be normal at all the steps 176, 178 and 180.

For example, in the case of the photographic film 22 shown in FIG. 9, the image density is low at an entire recording region in the leading image frame 142A. Therefore, in the image density detection in the step 176, it is judged to be abnormal. In the subsequent image frame, that is, the second image frame 142B, in the step 176, the subject image 143 whose image density is high is detected, therefore, it is judged that the image density is normal. Next, in the step 178, it is judged that fogging is not formed in the image frame 142B, therefore, it is judged to be normal. However, in the step 180, frame edges of the image frame 142B cannot be detected, namely, recorded position of the image frame 142B cannot be specified, it is judged to be abnormal in step 180. In the third image frame 142C, due to that the image density being low, that is the same as the leading image frame, it is judged to be abnormal in the step 176.

When the fourth image frame 142D, in which a landscape or the like is recorded, reaches the frame position detecting sensor 134, due to that the image density can be detected, it is judged to be normal in the step 176. Further, due to that the fogging is not formed in the image frame 142D, it is judged to be normal in the step 178. Further, due to that the recorded position of the image frame 142D can be specified on the basis of the detecting information of the frame edge 150Lo which is at the downstream side in the conveying direction and the frame edge 150Up which is at the upstream side in the conveying direction, it is judged to be normal in the step 180. Then, the recorded position of the image frame 142D is specified (defined) and the process proceeds to a step 182.

In the step 182, due to that the variable N becomes 4-count which indicates that the image frame is the fourth frame, the determination is negative in the step 182 and the process proceeds to the step 186.

In a step 186, in the case of the photographic film 22 shown in FIG. 9, it is judged that three image frames (N−1 image frames) exist before the fourth image frame (Nth image frame) whose recorded position has been specified. Next, in a step 188, recorded positions corresponding to 3 (N−1) image frames, that is, the leading image frame, the second image frame and the third image frame in this case, are set in the downstream side in the conveying direction with respect to the image frame 142D of the photographic film 22 (in the leading end side with respect to the image frame 142D) on the basis of a reference value F (38 mm in a case of 135 size photographic film) of a predetermined interval between image frames. As the result, recorded positions of the image frames 142A, 142B and 142C, which were not able to be specified (defined) in the previous step 180, are defined, and the recorded position of the leading image frame (the image frame 142A) is determined.

In a step 190, the roller driving motor drives to rotate the driving roller 138 correspondingly to a predetermined pulses on the basis of the conveyance distance information of the photographic film 22, the photographic film 22 is conveyed in the predetermined conveying direction with the predetermined distance by the driving roller 138 and the driven roller 140, and the center of the leading image frame 142A is positioned at the optical axis 1 of the reading section 43 (the image reading section). Then, the conveyance of the photographic film 22 is stopped, and the present routine is ended.

In the case of the photographic film 22 shown in FIG. 9, due to that the frame edge 150Up (the upstream side frame edge) of the fourth image frame 142D passes through the frame position detecting sensor 134, the recorded position of the fourth image frame 142D is specified. Because the distance X in the film conveying direction between the optical axis L of the reading section 43 and the frame position detecting sensor 134 is set to the length of 2.5 frames of the 135 size photographic film, when the fourth image frame 142D is specified, the center of the leading image frame 142A has already passed through the optical axis L of the reading section 43. Accordingly, the photographic film 22 is controlled to be conveyed in a revere direction which is opposite to the direction shown by the arrow D in FIG. 8 such that the center of the leading image frame 142A is returned to the optical axis L of the reading section 43.

The case in which the recorded position of the leading image frame which cannot be detected by the frame position detecting sensor 134 (whose recorded position cannot be specified by the frame position detecting sensor 134) is specified on the basis of the recorded position of the fourth image frame which is specified first (detected first), is described above. However, in a case in which an image frame whose recorded position is specified first is the second image frame, the third image frame or the image frames subsequent to the fourth image frame (that is, a fifth image frame, a sixth image frame . . . ), the leading image frame is specified in the similar way described above. Further, in the present embodiment, in a case in which the recorded position of the leading image frame can be specified by the second image frame, because the leading image frame has not reached the optical axis L of the reading section 43 when the position of the second image frame is specified, the photographic film 22 is controlled and conveyed in a forward direction (shown by the arrow D in FIG. 8), and the leading image frame 142A is positioned at the image reading section.

As described above, when the leading frame detecting routine is ended, reading of image frames by the step 152 of the main routine is carried out. In this image reading, the lights of R, G, B and IR emitted from the light source section 30 are irradiated on the image frame 142A. Each light transmitted through the image frame 142A is read by the area CCD sensor 116. operations, in which the photographic film 22 is conveyed and the conveyance of the photographic film 22 is stopped when the center of the image frame is set to be positioned at the optical axis L of the image reading section, are repeated regarding subsequent image frames, and the image frames 142B, 142C, 142D . . . are sequentially read.

Further, in the area CCD scanner 14 in accordance with the present embodiment, an image that is aligned (positioned) with the optical axis L of the reading section 43 and is to be read is displayed onto the display 18, the area CCD scanner 14 has a function of making an operator visually check whether the image is properly positioned and feed (make a fine adjustment of) a photographic film, if necessary, to correctly align the image with the reading position. Thus, as is the case with the above photographic film 22, it is possible to align leading image frames 142A, 142B, and 142C having unclear frame edges with the reading positions and then to correct their positions by use of the above function before the images are read.

Still further, as to correcting the reading position of the leading image frame or a plurality of image frames successive from the leading image frame whose recorded positions are specified by the above described routine for detecting leading frame, the area CCD scanner 14 in accordance with the present embodiment is provided with two kinds of modes of "a semi-automatic mode" in which the reading position can be corrected before the image is read and "a full-automatic mode" in which the reading position can be corrected after the image is read. These modes are set by the operator as follows: the operator sees a menu screen shown on the display 18 and inputs one of the modes by the use of keyboards 12A and 12B or the operator operates a mode selection button (not shown) mounted on a film carrier 38 to select any one of the modes.

In the semi-automatic mode, when the leading image frame having unclear frame edges is aligned with the reading position by the routine for detecting leading frame, the photographic film is stopped from being conveyed and the image to be read is shown for monitoring in video mode on the display 18. The operator visually checks whether the position of the image shown on the display 18 is correct or not, feeds the photographic film, if necessary, and again operates a start key, or a specifically designed image reading key that is separately mounted to start reading the image.

On the other hand, in the full-automatic mode, when the leading image frame having unclear frame edges is aligned with the reading position by the routine for detecting leading frame, reading the images is continuously carried out. Then, when reading the image of a final image frame (images of a roll of photographic film) is completed, the photographic film is stopped from being conveyed and thumbnail images (contracted images) of the read images from the leading image frame to the final image frame are successively shown on the display 18. The operator checks these thumbnail images of the read images and if he/her does not find abnormalities such as a shift in position, finishes reading the images on the photographic film as they are. On the other hand, as is the case with the above photographic film 22, when the operator finds that the position of the leading image frame 142A, the second image frame 142B, or the third image frame 142C the position of which is specified by the routine for detecting leading frame needs to be corrected, the operator corrects the position.

At that time, when the operator operates a mouse 20 or the keyboards 12A, 12B to select with a cursor the thumbnail image of the image frame the position of which is to be corrected, the photographic film is conveyed in an opposite (reverse) direction and the selected image frame is aligned with the reading position and then the photographic film is stopped from being conveyed. Subsequently, as is the case with the semi-automatic mode, the image to be read is shown for monitoring on the display 18. The operator checks the position of the image shown on the display 18, feeds the photographic film to correct the reading position, defines the reading position, then operates the start key again or operates a specifically designed image re-reading key that is separately provided to reread the image frame. This reread image is shown on the display 18 and if it is proper, the operator operates defining operation for the menu screen shown on the display 18. Then, the read image of the image frame is replaced with the reread image. Further, after the image is reread, it is also possible to show the reread image and the first read image on the display 18 and to compare them. Further, it is possible to define the position in the manner described above after comparing and checking the reread image and the first read image. Still further, in a case in which the operator finds that the position of the reread image needs to be further corrected, when the operator selects the reread image shown on the display 18 with the cursor, the state is changed to a state where the image can be read. Then, by correcting the position and rereading the image in the manner described above, the image can be reread again. This operation can be repeated until a proper image can be obtained.

In this manner, in the case of the foregoing photographic film 22, when the operator finishes correcting the position of the leading image frame 142A, the second image frame 142B, or third image frame 142C and then the operator performs an exiting operation on the menu screen shown on the display 18, the photographic film 22 is conveyed in a normal direction and is discharged from the film carrier 38.

Moreover, the area CCD scanner 14 in accordance with this embodiment has two kinds of modes of "a normal reading mode" of performing an operation shown in FIG. 12 and "a preceding reading mode" that will be described later, as to performing an image reading processing after specifying the recorded position of the leading image frame or the recorded positions of the plurality of image frames successive from the leading image frame having unclear frame edge(s) by the routine for detecting leading frame. These modes are set by the operator in the following way: the operator sees the menu screen shown on the display 18 and inputs one of the modes with the keyboards 12A, 12B or the operator selects a mode selection button (not shown in the drawings) mounted on the film carrier 38 to select one of the modes.

In the preceding reading mode, the same operations as in the normal reading mode are performed until step 188 (the recorded position of the leading image frame having unclear frame edges or those of the plurality of images successive from the leading image frame is or are specified). Thereafter, the image frame the frame edge of which is first detected by the sensor for detecting frame edge 134 thereby to have its recorded position specified (in the case of the photographic film 22, the fourth image frame 142D) is aligned with the reading position and the image reading operation is started from this image frame. That is, the image reading operation is started by using the foregoing image frame the recorded position of which is first specified as "a temporary leading image frame".

Then, when reading the final image frame of the photographic film is finished, the photographic film is conveyed in the opposite direction and the leading image frame specified at the foregoing step 188 is aligned with the reading position and then the photographic film is stopped from being conveyed. Then, the image to be read is shown for monitoring on the display 18.

Here, the operator checks the image that is shown for monitoring and is to be read (the leading image frame) and determines whether this image needs to be read or not. In a case in which the operator determines that the image needs to be read, the operator operates the start key again or operates a specifically designed image reading key that is separately provided to read the image. Here, if necessary, it is possible to feed the photographic film and to correct the reading position of the image.

On the other hand, in a case in which the operator determines that the image does not need to be read because the image is hardly shown in a region that is shown for monitoring and is to be read or cannot be visually identified, the operator operates the keyboards 12A, 12B to input a cancellation instruction to the menu screen shown on the display 18. For example, in a case of the photographic film 22, when reading the image of the leading image frame 142A is performed or cancelled, the photographic film 22 is conveyed in the normal direction and the second image frame 142B is aligned with the reading position. The operator can also determine whether the image frame 142B needs to be read or not and select between execution and cancellation of reading the image frame. When the operator finishes processing the second image frame 142B, the third image frame 142C is then aligned with the reading position and the operator can also select between execution and cancellation of reading the image frame 142C in the same manner. When the operator finishes these processings, the photographic film 22 is conveyed in the normal direction and is discharged from the film carrier 38. In this manner, the image reading processing of a roll of photographic film in the preceding reading mode is finished.

Up to this point, in this preceding reading mode, it is possible to check, with respect to the leading image or the plurality of images successive from the leading image the recorded position of which cannot be specified by detecting the frame edges, images to be read before reading and to select between correcting the reading position of the image, if necessary, and not reading the images. Thus, this offers the operator a wide selection of image reading processings.

Moreover, the area CCD scanner 14 in accordance with this embodiment has two kinds of modes of "a stop mode" of stopping the photographic film from being conveyed under the following conditions in a case in which the positions of a predetermined number of image frames cannot be specified or in a case in which the position of the image frame cannot be specified before the photographic film is conveyed a predetermined distance, by the routine for detecting leading frame, for the photographic film in which many image frames successive from the leading image frames have unclear frame edges, and "a continuous mode" of continuing to specify the position without stopping the photographic film from being conveyed even under the above described conditions. These modes are set by the operator in the following manner: the operator sees the menu screen shown on the display 18 and inputs one of the modes with the keyboards 12A, 12B or operates a mode selection button (not shown) mounted on the film carrier 38 to select one of the modes. Further, when the operator selects the stop mode, the operator sets the foregoing number of image frames or the foregoing photographic film carriage distance by numerically inputting or selecting one from among a plurality of kinds of conditions that are predetermined.

For example, in a case in which the number of image frames is set at "4 frames" in the stop mode, when the number of image frames the recorded positions of which cannot be specified by the routine for detecting leading frame reaches 4 frames, the photographic film is stopped from being conveyed. Then, the operator recognizes that at least 4 frames incapable of being automatically read are on the leading side of the photographic film to be read. Then, the operator may remove the photographic film from the film carrier 38 and visually check the image recorded on the photographic film thereby to quickly respond to the image reading processing of the photographic film.

Further, in a case in which the film carriage (conveyance) distance of the photographic film is set for the condition of the stop mode, a numeral such as 150 mm, 200 mm, 250 mm or the like is inputted for the carriage distance, or a condition can be selected from among a plurality of kinds of predetermined conditions such as "short" of a short carriage distance, "long" of a long carriage distance, or the like.

Still further, in this stop mode, in a case in which the recorded positions of all the image frames cannot be specified in the photographic film in which the number of recorded image frames is smaller than the number of image frames set for the condition or in the photographic film the length of which is shorter than the set film carriage distance set for the condition, the photographic film is automatically stopped from being conveyed.

Up to this point, in this stop mode, in a case in which many image frames the recorded positions of which cannot be specified because their edges are unclear exist successively from the leading image frame, it is a time-wasting operation to keep the photographic film being conveyed until the image frame shows up the position of which can be specified. In contrast, in a case in which the positions of the predetermined number of image frames cannot be specified or in a case in which the position of the image frame cannot be specified before the photographic film is conveyed the predetermined carriage distance, the photographic film is stopped from being conveyed and, after the film is stopped from being conveyed, the operator can align the image frame with the reading position by hand (manually). Thus, it is possible to shorten a time required to read the image.

Moreover, the area CCD scanner 14 in accordance with this embodiment has "an image checking mode" of aligning the first detected image among the detected images with the reading position, in a case in which the recorded positions of all the image frames cannot be specified, or in a case in which the recorded position of the image frame cannot be specified under the conditions set in the foregoing stop mode, that is, in a case in which the positions of the predetermined number of image frames cannot be specified or in a case in which the position of the image frame cannot be specified before the photographic film is conveyed the predetermined carriage distance, but the image can be detected in the detection of density of the image frame at the step 176 in the routine for detecting leading frame. This image checking mode is set by the operator in the following manner: the operator sees the menu screen shown on the display 18 and inputs the mode with the keyboards 12A, 12B or operates a mode selection button (not shown) mounted on the film carrier 38 to select the mode. Further, this image checking mode can be functioned in combination with the foregoing stop mode.

In the image checking mode, for example, in a case in which the frame edges of all the recorded image frames are unclear in the photographic film 22 shown in FIG. 9, the image first detected by detecting the density of the image frame at step 176 of the routine for detecting leading frame is a subject image 143 recorded in the second image frame 142B and the position information of the subject image 143 is stored in the RAM 68 (see FIG. 6) of the area CCD scanner 14. Then, steps from 172 to 180 of the routine for detecting leading frame are repeated. When it is found that the positions of all the image frames of the photographic film 22 cannot be specified, or when the number of image frames the positions of which cannot be specified reaches "4 frames" in a case in which the number of image frames are set at "4 frames" in the stop mode, the photographic film 22 is conveyed in the opposite direction and the roller driving motor is rotated a predetermined number of pulses based on the position information of the subject image 143 to align the subject image 143 with the image reading section (within the opening 120 (within a reading range) of the film carrier 38) and then the photographic film is stopped from being conveyed. Subsequently, the subject image 143 is shown for monitoring on the display 18.

Here, the operator checks the subject image 143 shown for monitoring and determines whether the subject image 143 needs to be read or not. In a case in which the operator determines that the subject image 143 needs to be read, the operator operates the start key again or operates a specifically designed image reading key that is separately provided to read the subject image 143. Here, also in this case, the operator can feed the photographic film, if necessary, and correct the reading position of the image.

On the other hand, in a case in which the operator determines that the subject image 143 does not need to be read, the operator operates the keyboards 12A, 12B to input an instruction of canceling reading the image with respect to the menu screen shown on the display 18. Here, in a case in which an image whose density is detected next to detecting the density of the subject image 143 exists, that is, the image whose density is detected second exists, after inputting the cancellation instruction for the subject image 143, the operator controls the carriage of the photographic film 22, and can show the second detected image for monitoring or make the procedure proceed to the exit of the image reading processing or the like.

Up to this point, in this image checking mode, the operator does not need to search the image by feeding the photographic film (aligning the image with the reading position) while checking the monitor image in a reading region shown on the display 18. Therefore, it is possible to reduce load applied to the operator and to improve the efficiency of the image reading processing.

Further, as described above, the area CCD scanner 14 in accordance with the present embodiment has two kinds of carriage modes of "a normal carriage mode" of performing control on the carriage of the photographic film both in the normal direction and in the opposite direction and "an opposite-carriage prohibiting mode" of limiting the direction of carriage to the normal direction. These carriage modes can be used according to the kind of film and be set by the operator in the following way: the operator sees the menu screen shown on the display 18 and inputs one of the modes with the keyboards 12A, 12B or operates a mode selection button (not shown) mounted on the film carrier 38 thereby to select one of the modes.

For example, the opposite-carriage prohibiting mode is selected for a 135-size reversal film that is easily scratched when conveyed in the opposite direction. In this opposite-carriage prohibiting mode, in a case in which the frame edges of the leading image frame or the plurality of images successive from the leading image frame are unclear, as is the case with the foregoing "preceding reading mode", the image reading processing is started from the image frame the frame edge of which is first detected thereby to have its recorded position specified. Then, when the reading of the final image frame is completed, then, the photographic film is ejected.

As described above, in this opposite-carriage prohibiting mode, it is possible to prevent the film from being scratched that is easily scratched when conveyed in the opposite direction.

As described above, in the present embodiment, the plurality of the image frames 142 recorded on the photographic film 22 are respectively detected by the frame position detecting sensor 134 when the photographic film 22 is conveyed by the film carrier 138. The microprocessor 46 specifies each of the recorded positions of the image frames 142 on the basis of the detection results of the frame position detecting sensor 134. Further, the microprocessor 46 controls the film carrier 38 such that the center of the image frame whose recorded position is specified is positioned at the optical axis L of the reading section 43. Further, in a case in which the recorded position of the leading image frame (the image frame 142A) of the film or the recorded positions of image frames successive from the leading image frame (the leading image frame 142A, the image frame 142B and the image frame 142C) of the film, among the plurality of image frames 142, cannot be specified, the microprocessor 46 controls the film carrier 38 such that the photographic film 22 is conveyed until the image frame whose position can be specified (the image frame 142D) is arrived at the section (the image detection is sequentially carried out). The recorded positions of the image frames which cannot be specified (the image frame 142A, 142B and 142C) are specified on the basis of the recorded position of the image frame which can be specified (the image frame 142D). The microprocessor 46 controls the film carrier 38 such that the leading frame image 142A is positioned in the image reading section by conveying the photographic film 22 in the predetermined direction. Then, the predetermined image reading is sequentially carried out from the leading image frame (the image frame 142A).

As the result, an operator does not need to carry out an annoyance operation in which the image frame is positioned at the image reading position manually in a case in which the leading image frame cannot be specified. Accordingly, burden of the operator is reduced, and efficiency of the image reading processing can be improved.

In the present embodiments described above, the light source section structured by the lamp is used as the light source of the image reading section. However, the present invention is not limited to the same. The light source section structured by LED (light emitting diode) can be used. Further, in the present embodiments, the area CCD is used. However, the present invention is not limited to the same. A device other that the area CCD, for example, a photoelectric conversion device (a solid photoelectric device) such as a MOS type sensor(a MOS type photoelectric sensor) can be used. Further, in the present embodiments, the infrared (IR light)is used as the light in the non-visible light region. However, the present invention is not limited to the same. An ultraviolet can be used.

Figure 12:
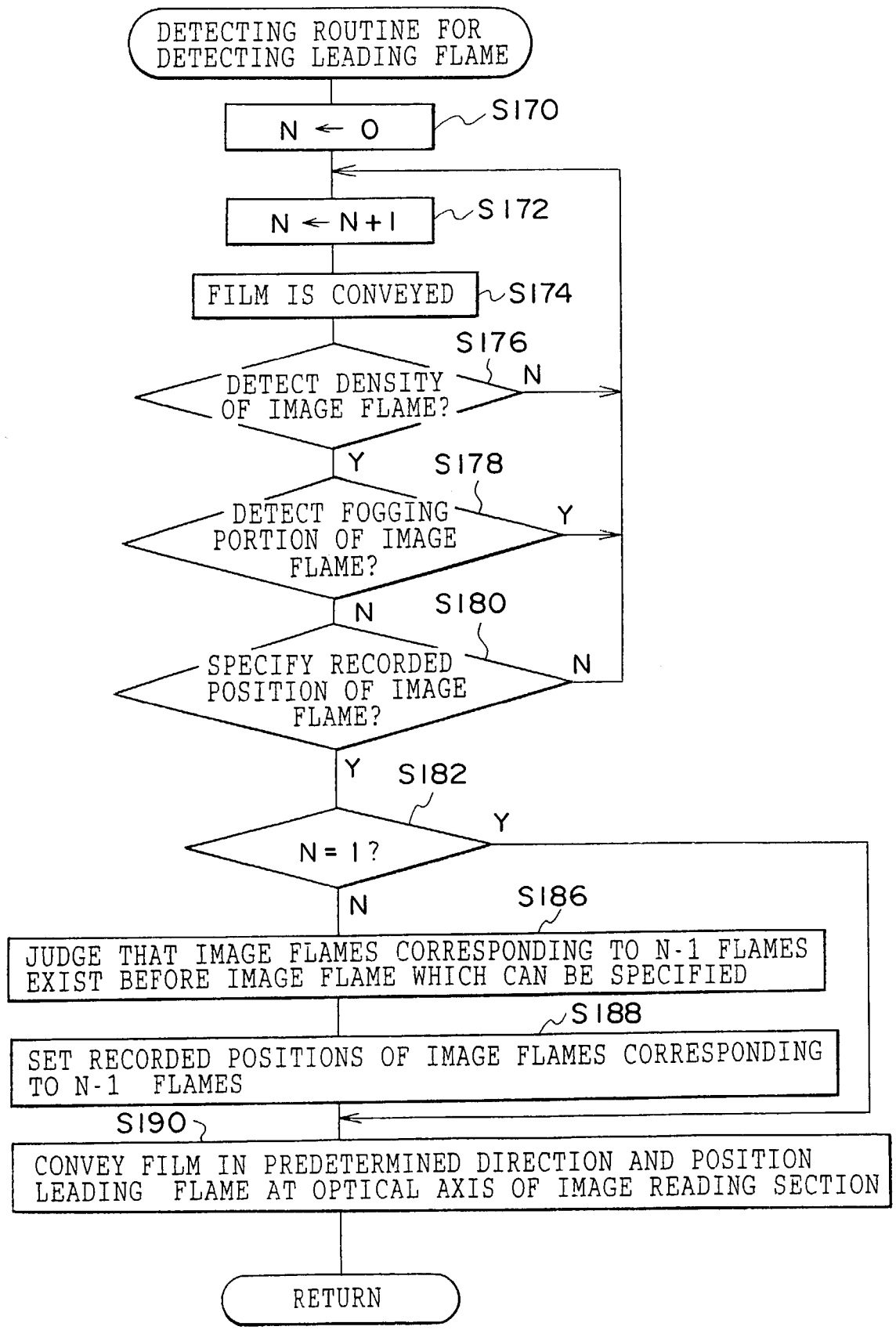
FIG. 12 is a flowchart showing a detecting routine for detecting a leading frame in step 151 shown in FIG. 10

Further, in the description of the leading frame detecting routine shown in FIG. 12, the number of the image frames existing before (at the leading edge side with respect to) the image frame whose recorded position can be specified is judged (counted) by image-frame-counting method in which image frame number is counted up 1 every time the photographic film 22 is conveyed in a predetermined distance. However, the present invention is not limited to the same. The number of the image frames can be calculated directly from the film conveyance distance, or other method can be applied.

As described above, due to that the image reading apparatus of the present invention has the structure described above, reading of the images of the film, in the case in which the read position of the leading image frame or the read positions of image frames successive from the leading image frame (including the leading image frame) cannot be specified, is improved. Further, due to that the image reading method by the image reading apparatus of the present invention is the method described above, reading of the images of the film, in the case in which the read position of the leading image frame or the read positions of the image frames successive from the leading image frame cannot be specified, is improved.

What is claimed is:

1. An image reading apparatus in which a plurality of images recorded on a film are read, the image reading apparatus comprising:
a moving section which moves the plurality of images to an image reading position respectively by conveying the film;
an image detecting section which detects the plurality of images respectively while the film is conveyed;
a control section which specifies a recorded position of the image on the basis of the detection result by the image detecting section, and controls the moving section such that the image whose recorded position is specified is positioned at the image reading position,
wherein, in a case in which one of a recorded position of a leading image of the film or recorded positions of images successive from the leading image of the film, among the plurality of images, cannot be specified,
the control section further carries out control such that the recorded position of the image whose recorded position cannot be specified, is specified on the basis of a recorded position of the image whose recorded position can be specified, and
the moving section conveys the film in a predetermined direction such that the leading image is positioned at the image reading position.

2. An image reading apparatus in which a plurality of images recorded on a film are read, the image reading apparatus comprising:
a moving section which moves the plurality of images to an image reading position respectively by conveying the film;
an image detecting section which detects the plurality of images respectively while the film is conveyed;
a control section which specifies a recorded position of the image on the basis of the detection result by the image detecting section, and controls the moving section such that the image whose recorded position is specified is positioned at the image reading position,
wherein, in a case in which one of a recorded position of a leading image of the film or recorded positions of images successive from the leading image of the film, among the plurality of images, cannot be specified,
the control section further carries out control such that the recorded position of the image whose recorded position cannot be specified, is specified on the basis of a recorded position of the image whose recorded position can be specified;
reading of images, including the image whose recorded position can be specified, subsequent to the image whose recorded position can be specified is carried out successively, and
the moving section conveys the film in a predetermined direction such that the leading image is positioned at the image reading position after reading of a last image of the film is carried out.

3. An image reading apparatus in which a plurality of images recorded on a film are read, the image reading apparatus comprising:
a moving section which moves the plurality of images to an image reading position respectively by conveying the film;
an image detecting section which detects the plurality of images respectively while the film is conveyed;

a control section which specifies a recorded position of the image on the basis of the detection result by the image detecting section, and controls the moving section such that the image whose recorded position is specified is positioned at the image reading position, wherein, in a case one of that recorded positions of the all plurality of images cannot be specified, and the image detecting section can detect the images, recorded positions of a predetermined number of images successive from a leading image of the film cannot be specified, and the image detecting section can detect the images, or recorded positions of images cannot be specified during the film is conveyed for a predetermined distance, and the image detecting section can detect the images, the control section further controls the moving section such that an image detected first among the images which can be detected is positioned at the image reading position.

4. The image reading apparatus of claim 1 further comprising a mode setting section which can set a stop mode in which conveyance of the film by the moving section is made to stop in a case in which recorded positions of a predetermined number of images successive from the leading image of the film cannot be specified, or recorded positions of images cannot be specified during the film is conveyed in a predetermined distance.

5. The image reading apparatus of claim 2 further comprising a mode setting section which can set a stop mode in which conveyance of the film by the moving section is made to stop in a case in which recorded positions of a predetermined number of images successive from the leading image of the film cannot be specified, or recorded positions of images cannot be specified during the film is conveyed in a predetermined distance.

6. The image reading apparatus of claim 3 further comprising a mode setting section which can set a stop mode in which conveyance of the film by the moving section is made to stop in a case in which the recorded positions of the predetermined number of images successive from the leading image of the film cannot be specified, or the recorded positions of images cannot be specified during the film is conveyed in the predetermined distance.

7. The image reading apparatus of claim 1 further comprising a mode setting section which can set a conveyance mode in which a conveying direction of the film conveyed by the moving section is limited to one direction in accordance with a type of the film.

8. The image reading apparatus of claim 2 further comprising a mode setting section which can set a conveyance mode in which a conveying direction of the film conveyed by the moving section is limited to one direction in accordance with a type of the film.

9. The image reading apparatus of claim 3 further comprising a mode setting section which can set a conveyance mode in which a conveying direction of the film conveyed by the moving section is limited to one direction in accordance with a type of the film.

10. An image reading method of an image reading apparatus comprising a moving section which moves a plurality of images to an image reading position respectively by conveying a film, an image detecting section which detects the plurality of images respectively while the film is conveyed, and a control section which specifies a recorded position of the image on the basis of the detection result by the image detecting section, and controls the moving section such that the image whose recorded position is specified is positioned at the image reading position, the method comprising the steps of, in a case in which one of a recorded position of a leading image of the film or recorded positions of images successive from the leading image of the film, among the plurality of images, cannot be specified, specifying the recorded position of the image whose recorded position cannot be specified on the basis of a recorded position of the image whose recorded position can be specified, and conveying the film in a predetermined direction such that the leading image is positioned at the image reading position.

11. An image reading method of an image reading apparatus comprising a moving section which moves a plurality of images to an image reading position respectively by conveying a film, an image detecting section which detects the plurality of images respectively while the film is conveyed, and a control section which specifies a recorded position of the image on the basis of the detection result by the image detecting section, and controls the moving section such that the image whose recorded position is specified is positioned at the image reading position, the method comprising the steps of, in a case in which one of a recorded position of a leading image of the film or recorded positions of images successive from the leading image of the film, among the plurality of images, cannot be specified, specifying the recorded position of the image whose recorded position cannot be specified on the basis of a recorded position of the image whose recorded position can be specified, reading of images, including the image whose recorded position can be specified, subsequent to the image whose recorded position can be specified successively, and conveying the film in a predetermined direction such that the leading image is positioned at the image reading position after reading of a last image of the film is carried out.

12. An image reading method of an image reading apparatus comprising a moving section which moves a plurality of images to an image reading position respectively by conveying a film, an image detecting section which detects the plurality of images respectively while the film is conveyed, and a control section which specifies a recorded position of the image on the basis of the detection result by the image detecting section, and controls the moving section such that the image whose recorded position is specified is positioned at the image reading position, in a case one of that recorded positions of the all plurality of images cannot be specified, and the image detecting section can detect the images, recorded positions of a predetermined number of images successive from a leading image of the film cannot be specified, and the image detecting section can detect the images, or recorded positions of images cannot be specified during the film is conveyed for a predetermined distance, and the image detecting section can detect the images, the method comprising the step of positioning an image detected first among the images which can be detected at the image reading position.

13. The image reading apparatus of claim 1, wherein in a case in which the image whose recorded position can be specified is detected after the leading image of the film arrives at the image reading position, the leading image is positioned at the image reading position by the film being conveyed in the reverse direction.

14. The image reading method of claim 10, wherein in a case in which the image whose recorded position can be specified is detected after the leading image of the film arrives at the image reading position, the leading image is positioned at the image reading position by the film being conveyed in the reverse direction.

15. The image reading apparatus of claim 1, wherein in a case in which the image whose recorded position can be specified is detected before the leading image of the film arrives at the image reading position, the leading image is positioned at the image reading position without the film being conveyed in the reverse direction.

16. The image reading method of claim 10, wherein in a case in which the image whose recorded position can be specified is detected before the leading image of the film arrives at the image reading position, the leading image is positioned at the image reading position without the film being conveyed in the reverse direction.

17. The image reading apparatus of claim 1, wherein the film is conveyed to detect images until the image whose recorded position can be specified is detected.

18. The image reading apparatus of claim 2, wherein the film is conveyed to detect images until the image whose recorded position can be specified is detected.

19. The image reading method of claim 10, wherein the film is conveyed to detect images until the image whose recorded position can be specified is detected.

20. The image reading method of claim 11, wherein the film is conveyed to detect images until the image whose recorded position can be specified is detected.

21. The image reading apparatus of claim 1, wherein both a predetermined distance to move the leading image to the image reading position and the recorded position of the leading image are determined based on the image whose recorded position can be specified.

* * * * *